United States Patent
Segawa

(10) Patent No.: US 9,383,580 B2
(45) Date of Patent: *Jul. 5, 2016

(54) IMAGE DISPLAY DEVICE

(71) Applicant: JVC KENWOOD Corporation, Yokohama-shi (JP)

(72) Inventor: Masaru Segawa, Kanagawa (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/477,793

(22) Filed: Sep. 4, 2014

(65) Prior Publication Data

US 2014/0368923 A1  Dec. 18, 2014

Related U.S. Application Data

(63) Continuation of application No. PCT/JP2013/005949, filed on Oct. 7, 2013.

(30) Foreign Application Priority Data

Mar. 29, 2013 (JP) ................. 2013-071221

(51) Int. Cl.
   *G02B 27/14* (2006.01)
   *G03H 1/00* (2006.01)
   (Continued)

(52) U.S. Cl.
   CPC ............ *G02B 27/0101* (2013.01); *B60K 35/00* (2013.01); *G02B 5/02* (2013.01);
   (Continued)

(58) Field of Classification Search
   CPC ........... G02B 27/0172; G02B 27/0149; G02B 27/145; G02B 27/143; G02B 27/0025; G02B 27/144; G02B 27/013; G02B 23/02; G02B 23/18; G02B 5/045; G02B 27/0103; G02B 17/08

USPC ................. 359/630–639, 404, 407, 409–410, 359/618–619, 625, 13–14, 727, 732; 345/7, 345/9; 349/11; 631/633, 640; 353/11–12, 353/28, 119; 348/115; 351/41–159, 351/205–206, 210, 221

See application file for complete search history.

(56) References Cited

U.S. PATENT DOCUMENTS 6,690,522 B2 *  2/2004  Kobayashi et al. ........... 359/834
7,098,972 B2 *  8/2006  Saitoh et al. ................... 349/58
(Continued)

FOREIGN PATENT DOCUMENTS

EP  2 570 843 A1  3/2013
JP  2003-127707 A  5/2003
(Continued)

OTHER PUBLICATIONS

International Search Report and Written Opinion in PCT International Patent Application No. PCT/JP2013/005949, dated Nov. 5, 2013.
(Continued)

*Primary Examiner* — Dawayne A Pinkney
(74) *Attorney, Agent, or Firm* — Venable LLP; Michael A. Sartori; Todd R. Farnsworth

(57) ABSTRACT

A substrate housing portion stores a circuit substrate that outputs an image signal. The optical unit generates and projects an image based on the image signal output from the circuit substrate. The image is projected onto a combiner. The optical unit has an optical unit main body that includes a light source and an image display element, and a projection unit that is attached to the optical unit main body and that determines a projection direction. The projection unit is provided with an intermediate image screen that images an intermediate image and is freely removed from or installed in the optical unit main body.

4 Claims, 38 Drawing Sheets

(51) Int. Cl.
*G02B 27/10* (2006.01)
*G02F 1/1335* (2006.01)
*G03B 21/26* (2006.01)
*H04N 7/00* (2011.01)
*G02B 27/01* (2006.01)
*B60K 35/00* (2006.01)
*G02B 5/02* (2006.01)

(52) U.S. Cl.
CPC ...... *G02B 27/0149* (2013.01); *B60K 2350/922* (2013.01); *G02B 2027/0123* (2013.01); *G02B 2027/0145* (2013.01); *G02B 2027/0198* (2013.01)

(56) References Cited

U.S. PATENT DOCUMENTS 7,158,096 B1 * 1/2007 Spitzer ............................... 345/8
2008/0137193 A1 6/2008 Hsu et al.
2010/0026970 A1 * 2/2010 Tanaka ............................ 353/81
2012/0098819 A1 4/2012 Furuya et al.

FOREIGN PATENT DOCUMENTS

| JP | 2004-085752 A | 3/2004 |
| JP | 2005-082103 A | 3/2005 |
| JP | 2013-025205 A | 2/2013 |
| WO | WO-2011/132407 A1 | 10/2011 |

OTHER PUBLICATIONS

Extended European Search Report in European Patent Application No. 13876086.3, dated Sep. 28, 2015.

* cited by examiner

FIG.24

| | THICKNESS T OF DIFFUSION LAYER (μm) | RESOLUTION ON TRANSMISSION-TYPE INTERMEDIATE IMAGE SCREEN (μm) | CALCULATED VALUE RESOLUTION (μm) |
|---|---|---|---|
| EXEMPLARY EMBODIMENT 1 | 6 | 2 | 2 |
| EXEMPLARY EMBODIMENT 2 | 15 | 5 | 5 |
| EXEMPLARY EMBODIMENT 3 | 25 | 10 | 9 |
| EXEMPLARY EMBODIMENT 4 | 39 | 15 | 14 |
| EXEMPLARY EMBODIMENT 5 | 54 | 20 | 19 |
| EXEMPLARY EMBODIMENT 6 | 75 | 30 | 26 |
| EXEMPLARY EMBODIMENT 7 | 100 | 40 | 35 |
| EXEMPLARY EMBODIMENT 8 | 125 | 45 | 44 |
| COMPARATIVE EXAMPLE 1 | 188 | 70 | 66 |
| COMPARATIVE EXAMPLE 2 | 250 | 95 | 88 |
| COMPARATIVE EXAMPLE 3 | 400 | 150 | 141 |

FIG.30

| | THICKNESS OF DIFFUSION LAYER (μm) | BEAD DIFFUSION SHEET BASE THICKNESS (μm) | ADHESIVE LAYER THICKNESS (μm) | DISTANCE FROM DIFFUSION LAYER TO REFLECTION SURFACE: L (μm) | RESOLUTION ON REFLECTION-TYPE INTERMEDIATE IMAGE SCREEN (μm) | CALCULATED VALUE RESOLUTION (μm) |
|---|---|---|---|---|---|---|
| EXEMPLARY EMBODIMENT1 | 10 | 10 | 10 | 30 | 10 | 11 |
| EXEMPLARY EMBODIMENT2 | 10 | 38 | 10 | 58 | 20 | 20 |
| EXEMPLARY EMBODIMENT3 | 10 | 38 | 25 | 73 | 25 | 26 |
| EXEMPLARY EMBODIMENT4 | 10 | 50 | 25 | 85 | 30 | 30 |
| EXEMPLARY EMBODIMENT5 | 10 | 75 | 25 | 110 | 40 | 39 |
| COMPARATIVE EXAMPLE1 | 10 | 100 | 50 | 160 | 60 | 56 |
| COMPARATIVE EXAMPLE2 | 10 | 188 | 25 | 223 | 80 | 79 |
| COMPARATIVE EXAMPLE3 | 10 | 250 | 25 | 285 | 100 | 101 |

IMAGE DISPLAY DEVICE

BACKGROUND

1. Field of the Invention

The present invention relates to an image display device and particularly to an image display device that presents an image based on image display light to a user as a virtual image.

2. Description of the Related Art

In recent years, so-called head up displays that use LEDs or semiconductor laser light sources have been developed as image display devices. These head up displays include those that use screens for imaging a real image that corresponds to an image recognized as a virtual image by a user via a windshield of a vehicle (e.g., patent document No. 1). These screen include two types of screens: a reflection type screen provided with a reflection surface; and a transmission type screen provided with a transparent surface.

[Patent document No. 1] JP 2003-127707

In these head up displays, the screens are often used to widen the viewing angle of a video image by diffusing video light projected from a projection lens. These screens are formed from various materials, and the optical performance may be degraded due to changes over time depending on the materials.

Also, by changing the materials used for forming the screens, the optical properties of the screens such as viewing angles or the like can be changed. Therefore, there is a need for a technology that allows for the minimization of the number of components, easy assembly, and inexpensive manufacturing as well as a technology that facilitates the replacement of a screen such as the replacement of a screen according to the preference of the user, the replacement of a screen having reduced performance with a new screen, and the like.

SUMMARY

In this background, a purpose of the present invention is to provide a technology that facilitates the replacement and assembly of a screen in a head up display and that allows for inexpensive manufacturing.

An image display device according to one embodiment of the present invention, comprises: a substrate housing portion that stores a circuit substrate that outputs an image signal of an image to be displayed; an optical unit that is provided at one end of the substrate housing portion and that generates and projects an image based on the image signal output from the circuit substrate; and a combiner that is provided at one end of the optical unit and on which the image is projected. The optical unit has: an optical unit main body that includes a light source and an image display element; and a projection unit that is attached to the optical unit main body, that is provided with an intermediate image screen that images an intermediate image, and that determines a projection direction. The projection unit is freely removed from or installed in the optical unit main body.

According to the present invention, a technology can be provided that facilitates the replacement and assembly of a screen in a head up display and that allows for inexpensive manufacturing.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 24 is a diagram illustrating, in a table format, results of researching influence of the thickness of the diffusion layer on the resolution of a real image imaged on a surface of the transmission-type intermediate image screen by changing the thickness of the diffusion layer, and calculated values of resolution;

FIG. 30 is a diagram illustrating, in a table format, results of researching influence of the distance between the diffusion layer and a reflection surface on the resolution of a real image imaged on a surface of the reflection-type intermediate image screen by changing the distance from the diffusion layer to the reflection surface, and calculated values of the resolution;

DETAILED DESCRIPTION

Figure 1:
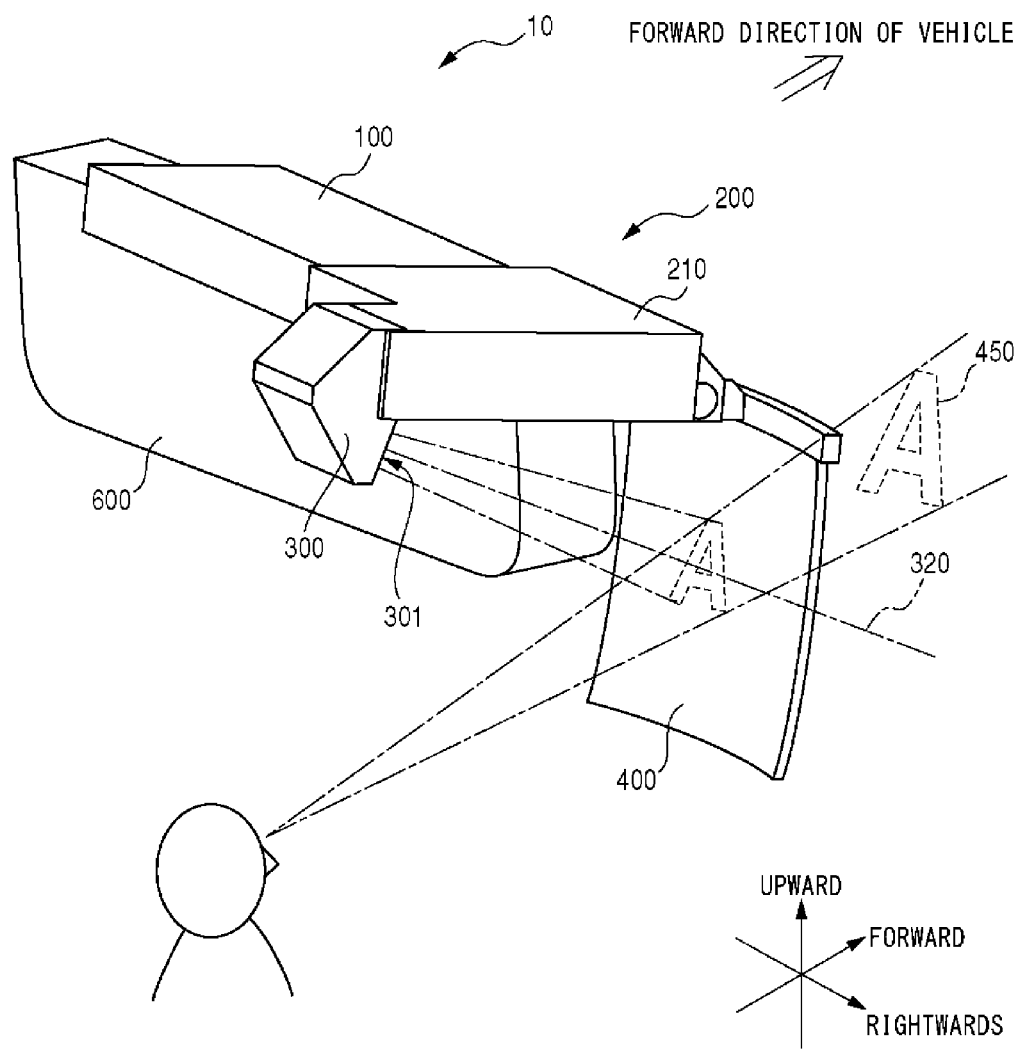
FIG. 1 is a perspective view of a head up display, which is a display device for a vehicle according to the present invention, shown by means of a field of view from the inside of the vehicle.

Described below is an explanation of the embodiments of the present invention with reference to figures. Specific numerical values and the like shown in the embodiments are shown merely for illustrative purposes to facilitate understanding of the invention and do not intend to limit the scope of the present invention, unless otherwise noted. In the subject specification and figures, elements having substantially the same functions and structures shall be denoted by the same reference numerals, and duplicative explanations will be omitted appropriately. Also, the illustration of elements that are not directly related to the present invention is omitted.

[Exterior Configuration of Display Device for Vehicle According to Present Embodiment]

Figure 2:
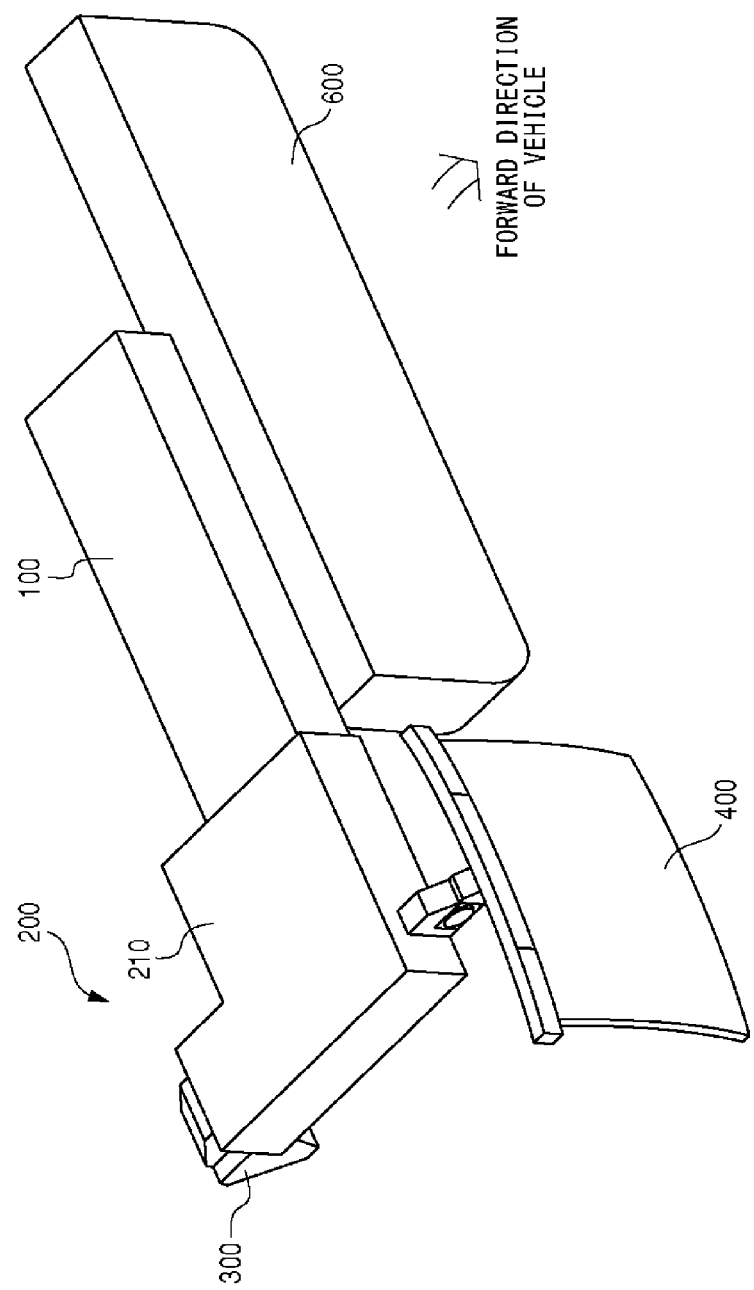
FIG. 2 is a perspective view of the head up display in FIG. 1 shown by means of a field of view from the side of a windshield.

Using a head up display attached to a rear-view mirror provided to a vehicle as an example for a display device for a vehicle according to the present embodiment, an explanation is given regarding the exterior configuration of the display device for a vehicle in reference to FIGS. 1 and 2. FIG. 1 is a perspective view of a head up display 10 according to the present embodiment observed by means of a field of view directed from a rear-view mirror 600, to which this head up display 10 is attached, to a windshield (not shown) of a vehicle. FIG. 2 is a perspective view of the head up display 10 observed by means of a field of view directed from the windshield (not shown) to the rear-view mirror 600. In the following explanations, directions that are shown as forward, backward, leftward, rightward, upward, and downward mean a forward direction, a backward direction, a leftward direction, a rightward direction, a direction that is vertical to a road surface on which a vehicle is placed and that is directed from the surface to the vehicle, and a direction that is opposite to the direction, respectively.

The head up display 10 generates an image signal related to an image displayed on a combiner 400 as a virtual image and is provided with a substrate housing portion 100 housing a circuit substrate 111 (see FIG. 5) that outputs the generated image signal to an optical unit 200. An image signal output from an external device (not shown) such as a navigation device, a media reproduction device, or the like is input to the circuit substrate 111, and the circuit substrate 111 is also capable of outputting the image signal to the optical unit 200 after performing a predetermined process on the signal that has been input. This substrate housing portion 100 is connected to an attachment member 500 described later (see FIG. 14), which is one of constituting elements of the head up display 10, and the rear-view mirror 600 is held by the attachment member 500. Thereby, the head up display 10 is attached to the rear-view mirror 600. Details will be described later regarding each of mechanisms related to the connection of the substrate housing portion 100 and the attachment member 500 and to the holding of the rear-view mirror 600 by the attachment member 500. Also, in order to facilitate explanations and understanding of the entire configuration of the head up display 10, the descriptions of the attachment member 500 are omitted in FIGS. 1 and 2.

The head up display 10 is provided with the optical unit 200 to which an image signal output from the circuit substrate 111 is input. The optical unit 200 is provided with an optical unit main body 210 and a projection unit 300. The optical unit main body 210 houses a light source 231 and an image display element 240, which are described later, various optical lenses, and the like. The projection unit 300 houses various projection mirrors and an intermediate image screen 360, which are described later. An image signal output by the circuit substrate 111 is projected from a projection port 301 as image display light on the combiner 400 having a concave shape via each of the devices of the optical unit main body 210 and each of the devices of the projection unit 300. In the present embodiment, a case where a liquid crystal on silicon (LCOS), which is a reflection type liquid crystal display panel, is used as the image display element 240 is illustrated for example. However, a digital micromirror device (DMD) may be used as the image display element 240. In that case, the DMD is assumed to be formed by an optical system and a drive circuit according to a display element to which the DMD is applied.

A user, who is a driver, recognizes projected image display light as a virtual image via the combiner 400. In FIG. 1, the projection unit 300 is projecting image display light of a letter "A" on the combiner 400. Looking at the combiner 400, the user recognizes the letter "A" in such a manner as if the letter were displayed, for example, 1.7 m to 2.0 m ahead (in a forward direction of the vehicle). In other words, the user can recognize a virtual image 450. In this case, a central axis of the image display light projected on the combiner 400 from the projection unit 300 is defined as a projection axis 320.

The optical unit 200 is configured such that the optical unit 200 is rotatable with respect to the substrate housing portion 100. A detailed explanation thereof will be described later. Further, the head up display 10 according to the present embodiment is configured such that the projection unit 300 and the combiner 400 are changeable in attachment direction with respect to a predetermined surface of the optical unit main body 210 and are detachable.

[Internal Configuration of Display Device for Vehicle According to Present Embodiment: Optical System]

Figure 3:
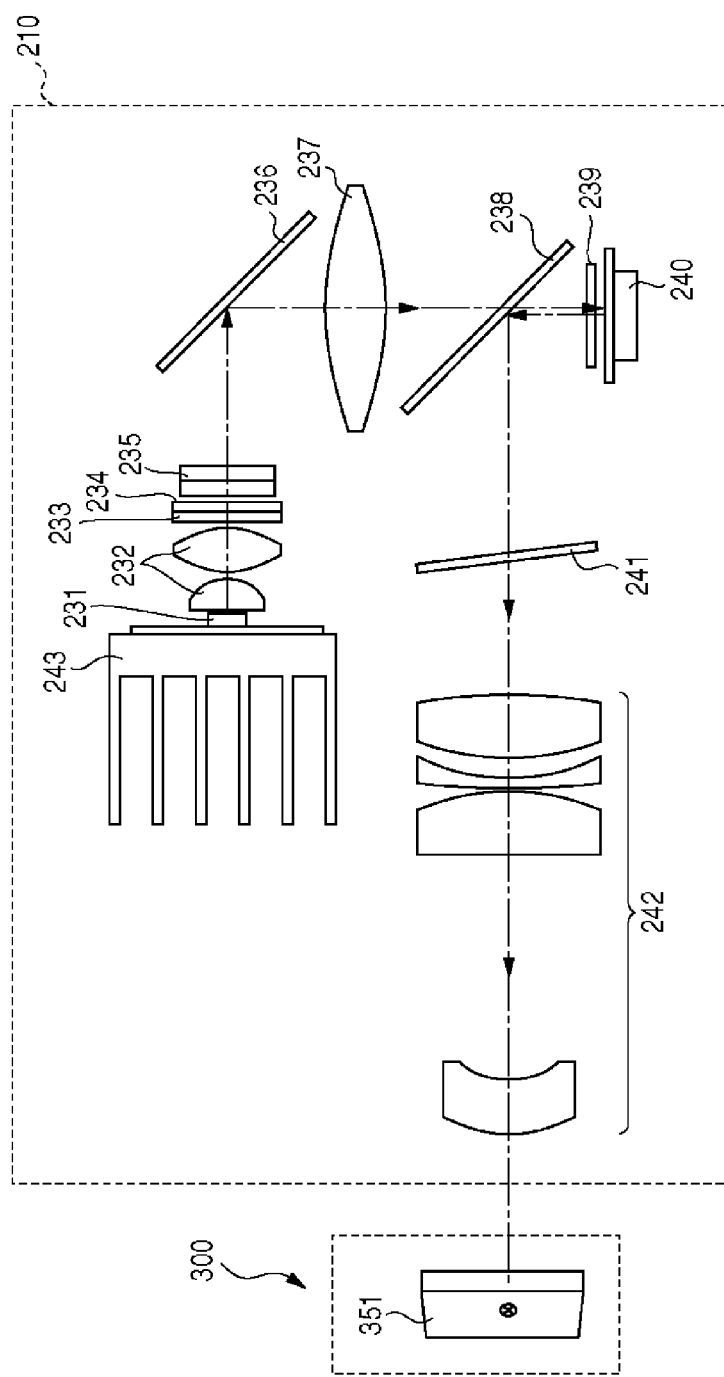
FIG. 3 is a diagram illustrating the internal configuration of an optical unit along with an optical path.
Figure 4:
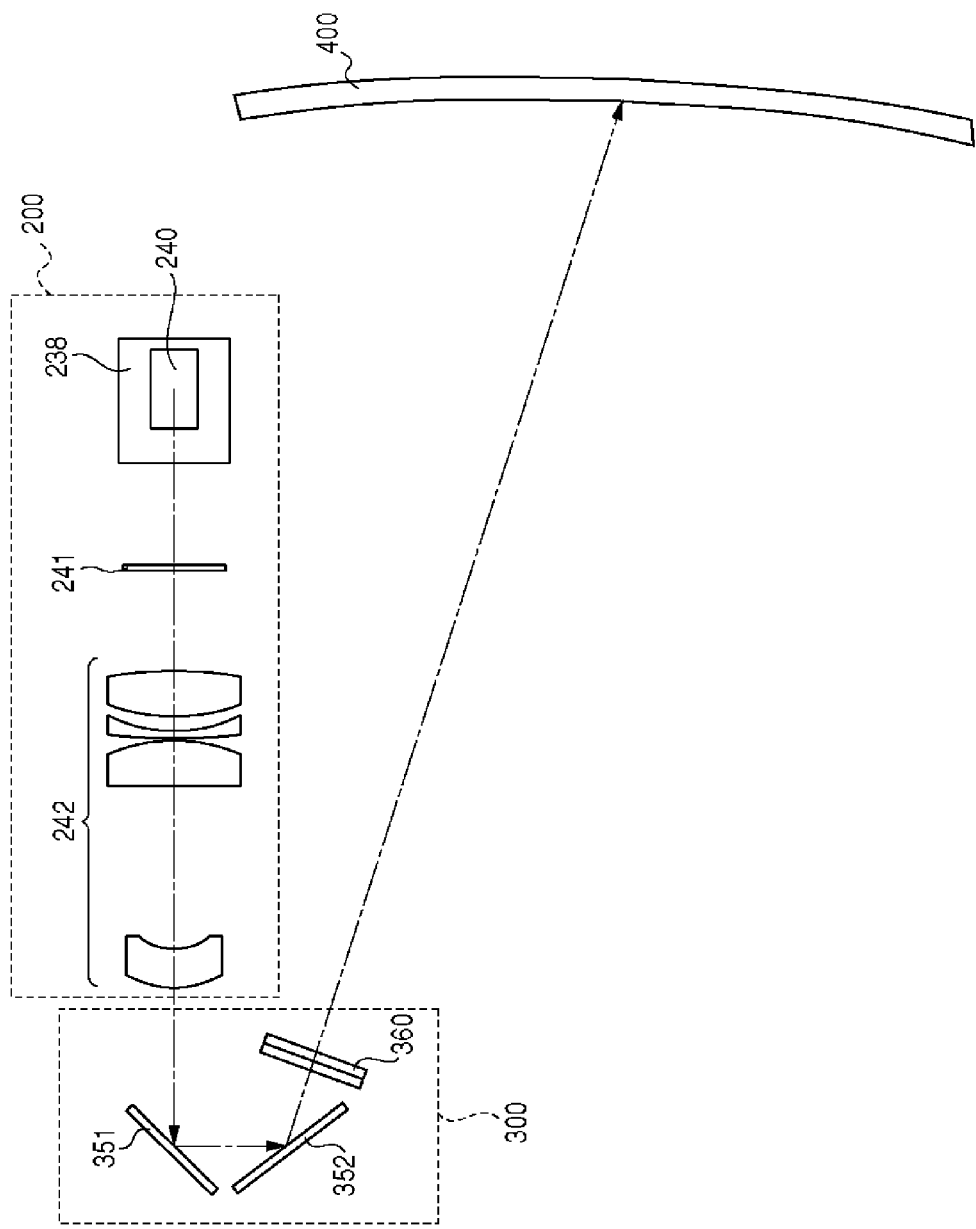
FIG. 4 is a diagram illustrating the internal configuration of the optical unit along with an optical path.

An explanation is now given regarding the internal configuration of the head up display 10. FIGS. 3 and 4 are diagrams for explaining the internal configuration of the optical unit 200 of the head up display 10 described above. FIG. 3 is a diagram illustrating the internal configuration of the optical unit main body 210 and a part of the internal configuration of the projection unit 300 along with an optical path related to image display light. FIG. 4 is a diagram illustrating the internal configuration of the projection unit 300 and a part of the internal configuration of the optical unit main body 210 along with an optical path related to image display light projected onto the combiner 400.

In reference to FIG. 3, an explanation is given regarding the internal configuration of the optical unit main body 210 and an optical path related to image display light. The optical unit main body 210 is provided with a light source 231, a collimate lens 232, a UV-IR (UltraViolet-Infrared Ray) cut filter 233, a polarizer 234, a fly-eye lens 235, a reflecting mirror 236, a field lens 237, a wire grid polarization beam splitter 238, a quarter-wave plate 239, an analyzer 241, a projection lens group 242, and a heat sink 243.

The light source 231 consists of a light-emitting diode that emits white light or light in three colors: blue, green, and red. The heat sink 243 for cooling heat generated along with emission of light is attached to the light source 231. Light emitted by the light source 231 is changed to parallel light by the collimate lens 232. The UV-IR cut filter 233 absorbs and removes ultraviolet light and infrared light from the parallel light passed through the collimate lens 232. The polarizer 234 changes light that has passed through the UV-IR cut filter 233 to P-polarized light without disturbance. The fly-eye lens 235 then adjusts the brightness of light that has passed through the polarizer 234 to be uniform.

The reflecting mirror 236 changes the optical path of light that has passed through each cell of the fly-eye lens 235 by 90 degrees. Light reflected by the reflecting mirror 236 is collected by the field lens 237. Light collected by the field lens 237 is radiated to the image display element 240 via the wire grid polarization beam splitter 238 and quarter-wave plate 239 that transmit P-polarized light.

The image display element 240 is provided with a color filter of a red color, a green color, or a blue color for each pixel. The light radiated to the image display element 240 is changed to a color that corresponds to each pixel, modulated by a liquid crystal composition provided on the image display element 240, and emitted toward the wire grid polarization beam splitter 238 while being S-polarized image display light. The emitted S-polarized light is reflected by the wire grid polarization beam splitter 238 and enters the projection lens group 242 after changing the optical path and passing through the analyzer 241.

The image display light transmitted through the projection lens group 242 exits the optical unit main body 210 and enters the projection unit 300. A first projection mirror 351 provided on the projection unit 300 then changes the optical path of the entering image display light.

Subsequently, in reference to FIG. 4, an explanation is given regarding the internal configuration of the projection unit 300 and an optical path related to image display light. The projection unit 300 is provided with the first projection mirror 351, a second projection mirror 352, and the intermediate image screen 360.

As described above, the optical path of the image display light that has passed through the wire grid polarization beam splitter 238, the analyzer 241, and the projection lens group 242 provided in the optical unit main body 210 is changed to an optical path heading toward the combiner 400 by the first projection mirror 351 and the second projection mirror 352. In the meantime, a real image based on the image display light reflected by the second projection mirror 352 is imaged on the intermediate image screen 360. The image display light related to the real image imaged on the intermediate image screen 360 is transmitted through the intermediate image screen 360 and projected on the combiner 400. As described above, the user recognizes a virtual image related to this projected image display light in the forward direction via the combiner 400.

An internal configuration such as the one described above allows for the user to visually recognize a virtual image based on an image signal output from the circuit substrate 111 while overlapping the virtual image on the real landscape via the combiner 400.

[Internal Configuration of Display Device for Vehicle According to Present Embodiment: Details of Internal Configuration of Optical Unit 200]

The optical unit 200 is configured such that the optical unit 200 is rotatable with respect to the substrate housing portion 100. Subsequently, in reference to FIG. 5, a detailed description is made regarding the internal configuration of the optical unit 200 and the substrate housing portion 100, mainly regarding an area near a part where the optical unit 200 and the substrate housing portion 100 are connected.

Figure 5:
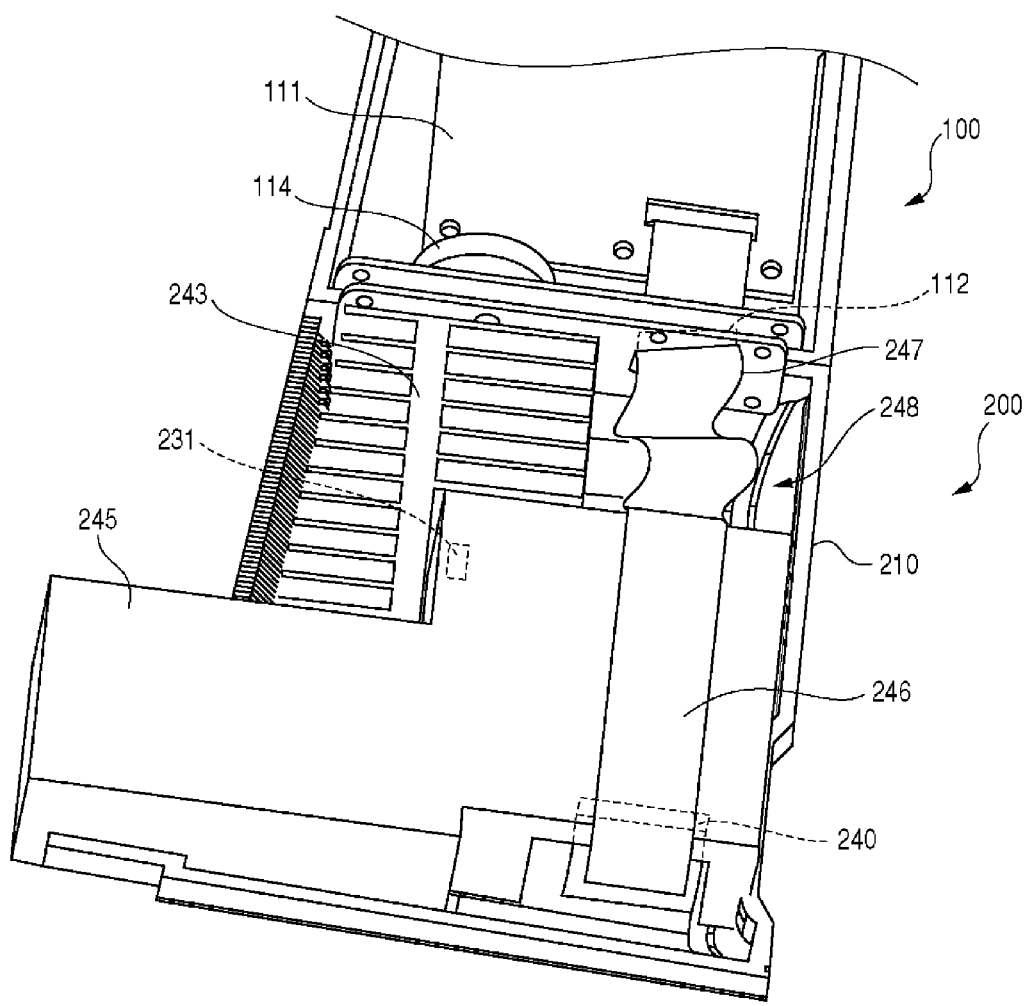
FIG. 5 is a diagram illustrating a part of the inside of the optical unit and a part of the inside of a substrate housing portion.

FIG. 5 is a diagram illustrating a part of the inside of the optical unit 200 and a part of the inside of the substrate housing portion 100. In FIG. 5, the area near the part where the optical unit 200 and the substrate housing portion 100 are connected is mainly shown. An optical system placement unit 245 provided in the optical unit 200 houses various devices except for the above-described heat sink 243. The heat sink 243 and a space 248 are provided inside the optical unit 200 near the part where the optical unit 200 is connected to the substrate housing portion 100 on the side of the substrate housing portion 100 of the optical system placement unit 245.

The circuit substrate 111 electrically controls the image display element 240 and the light source 231 housed in the optical system placement unit 245. The circuit substrate 111 and the image display element 240 housed in the optical system placement unit 245 are connected through a flexible cable 246, which is a wiring. The flexible cable 246 is shown as an example in the figure, and a wiring that transmits an electrical signal of a flexible substrate or the like can be used. In the optical unit 200, an optical unit side opening 247 is formed on a surface of a housing of the optical unit 200. In the substrate housing portion 100, a substrate housing side opening 112 is formed on a surface of a housing of the substrate housing portion 100. The flexible cable 246 connects the circuit substrate 111 and the image display element 240 through the optical unit side opening 247 and the substrate housing side opening 112. The flexible cable 246 preferably has a length that allows the substrate housing portion 100 and the optical unit 200 to rotate freely.

Figure 6:
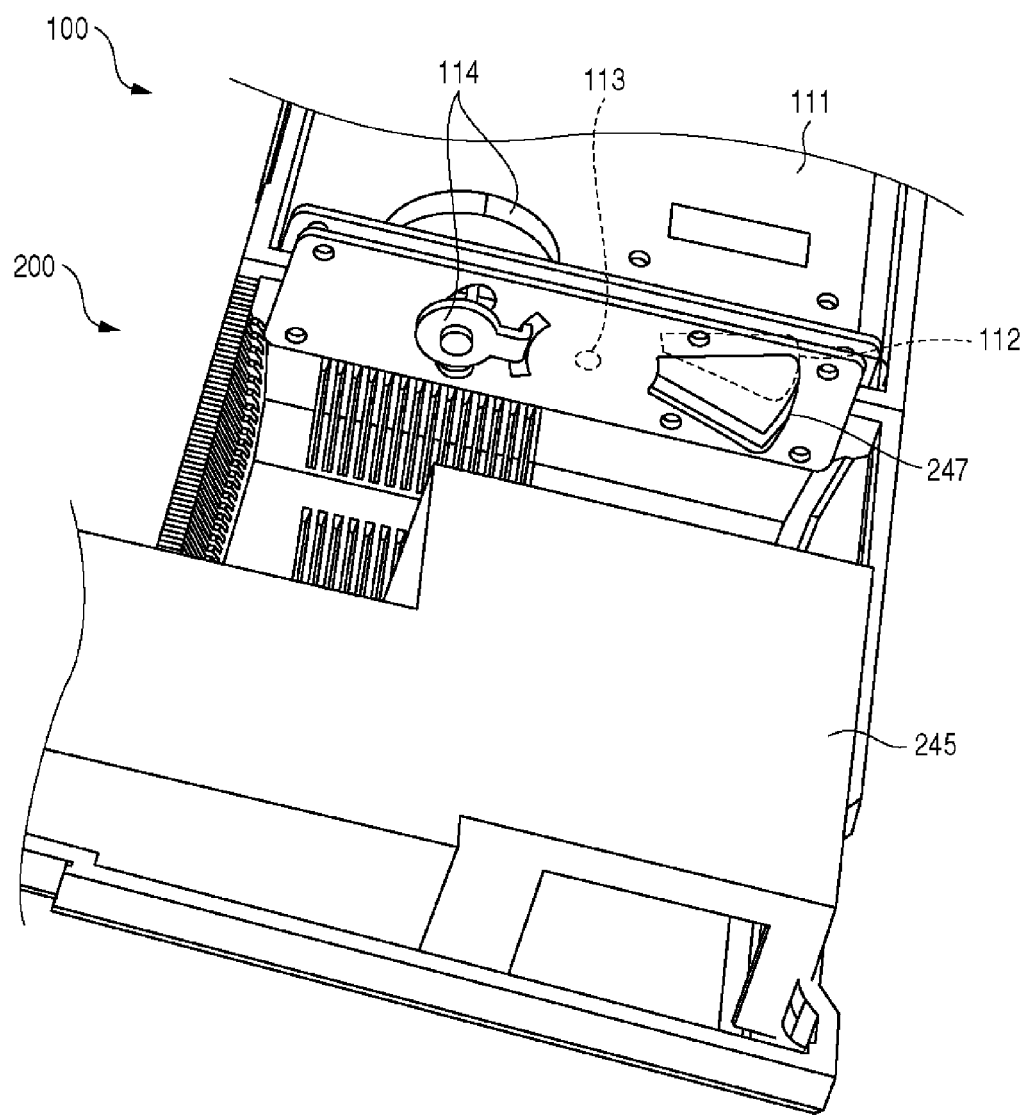
FIG. 6 is a diagram illustrating a state where a heat sink and a flexible cable are removed in FIG. 5.

FIG. 6 is a diagram illustrating a state where the above-stated heat sink 243 and the flexible cable 246 are removed regarding the part of the inside of the optical unit 200 and the part of the inside of the substrate housing portion 100 shown in FIG. 5.

The optical unit side opening 247 and the substrate housing side opening 112 each have a shape having two sides facing each other that diverge at a predetermined angle and, as an example, are formed in an approximately fan-like shape having a predetermined angle. This allows for a reduction in force applied to the flexible cable 246 by a housing relating to a surface of the optical unit 200 on which the optical unit side opening 247 is provided and by a housing relating to a surface of the substrate housing portion 100 on which the substrate housing side opening 112 is provided when the optical unit 200 is rotated with respect to the substrate housing portion 100. Therefore, breakage or cutting of the flexible cable 246 by the housings due to the rotation can be prevented.

Also, as described above, the space 248 is provided near the part where the substrate housing portion 100 is connected in the optical unit 200, and the flexible cable 246 is mainly housed by this space 248 in the optical unit 200. By providing this space 248, the length of the flexible cable can be ensured with a margin. Therefore, tension applied to the flexible cable 246 can be reduced when the optical unit 200 is rotated with respect to the substrate housing portion 100. Thus, breakage or cutting of the flexible cable 246 by the tension due to the rotation can be prevented.

The optical unit 200 and the substrate housing portion 100 are connected by a hinge 113, which is a rotating member serving as a rotation axis of the rotation of each other and a rotation lock mechanism 114, which restricts the angle range of the rotation. The optical unit 200 rotates with respect to the substrate housing portion 100 by a predetermined angle around this hinge 113. In the present embodiment, the hinge 113 is used in this case. However, another rotating member can be used.

The substrate housing side opening 112 of the substrate housing portion 100 and the optical unit side opening 247 of the optical unit 200 are formed in an approximately fan-like shape as described above. When the substrate housing portion 100 rotates with respect to the optical unit 200, an opening that is formed by both the substrate housing side opening 112 and the optical unit side opening 247 and that is for the flexible cable 246 to pass through is narrowed. However, an opening that is sufficient for the flexible cable 246 to pass through is maintained in the angle range restricted by the rotation lock mechanism 114 by the approximately fan-like shape of the substrate housing side opening 112 and the optical unit side opening 247.

The above-described shape of the substrate housing side opening 112 and the optical unit side opening 247 is shown for illustrative purposes. As long as the substrate housing side opening 112 and the optical unit side opening 247 have a shape that does not cause breakage or the like of the flexible cable 246 due to the rotation, the shape can be any form. For example, only one of the substrate housing side opening 112 and the optical unit side opening 247 may be formed in a shape having two sides facing each other that diverge at a predetermined angle such that a load is prevented from being imposed on the flexible cable 246.

As described above, the head up display 10 is configured such that the optical unit 200 and the substrate housing portion 100 are rotatable around the hinge 113. The combiner 400 is provided on the optical unit 200, and the substrate housing portion 100 is attached to the rear-view mirror 600 by the attachment member 500. By employing such a configuration described above, the user can perform adjustment of the observation angle of the rear-view mirror and adjustment of the observation angle of the combiner 400 independently from each other. Therefore, the user can adjust the visually-recognizable angle of the combiner 400 as well as adjusting the rear-view mirror 600 at an angle that allows for an area behind the vehicle to be properly checked so as to perform recognition of a proper distortionless image (virtual image).

Also, by providing the space 248 for housing the flexible cable 246 ensured with a length with a margin in the optical unit 200, rotation of the optical unit 200 with respect to the substrate housing portion 100 is achieved freely. Thereby, the user can properly adjust the respective observation angles, and breakage or cutting of the flexible cable 246 by tension due to the rotation can be prevented.

Further, by allowing the substrate housing side opening 112 and the optical unit side opening 247 of the optical unit 200 to have the above-stated approximately fan-like shape, breakage or cutting of the flexible cable 246 caused by the respective housing exterior walls of the optical unit 200 and the substrate housing portion 100 due to the rotation of the optical unit 200 with respect to the substrate housing portion 100 can be prevented, and the user can properly adjust the respective observation angles.

Also, as shown in FIG. 3, the optical path of the image display light is bent twice in the direction of 90 degrees by using the reflecting mirror 236 and the wire grid polarization beam splitter 238 in the present embodiment. The image display light is then emitted to the projection unit 300 in a direction opposite to the direction of light emission in the light source 231. By making the path of the image display light to be U-shaped in this way, the flexible cable 246 can be wired such that the flexible cable 246 and the light source 231 are not located close to each other (see FIG. 5). With this, noise caused by an electromagnetic wave generated by the light source 231 can be prevented from being mixed in an image signal, and breakage of the flexible cable 246 caused by heat generated by the light source 231 can be also prevented. Further, since the heat sink 243 installed close to the light source 231 is placed away from the flexible cable 246, the space 248 for housing the flexible cable 246 can be provided.

[Angle Adjustment Using Hinge]

Figure 7:
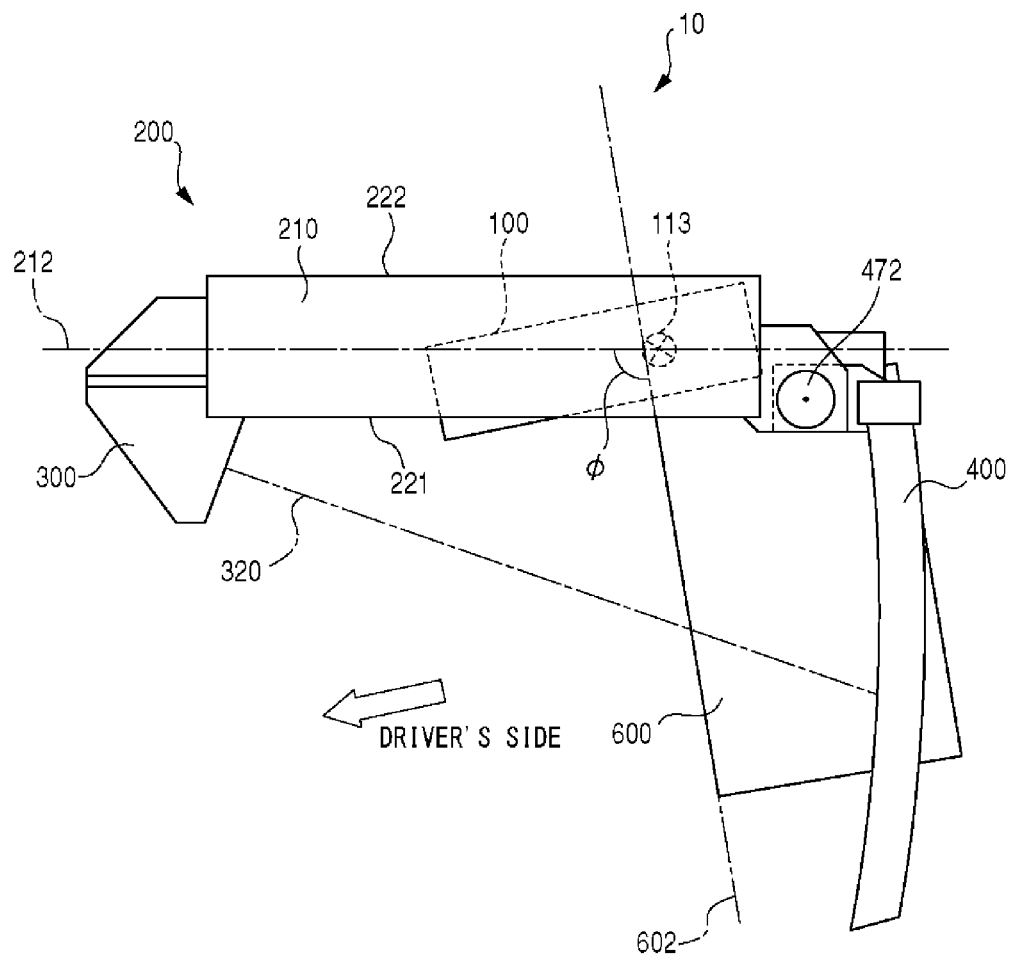
FIG. 7 is a lateral view of the head up display attached to a rear-view mirror.

A description is given in detail regarding the rotation of the optical unit 200 with respect to the substrate housing portion 100 described above. FIG. 7 is a lateral view of the head up display 10 attached to the rear-view mirror 600. As shown in this figure, the rear-view mirror 600 is normally directed to the driver side so that the driver can visually check behind the vehicle. In other words, a driver rarely drives while a mirror surface 602 of the rear-view mirror 600 is perpendicular to a vehicle bottom surface or a traveling road surface. Normally, a driver tilts the direction of the rear-view mirror 600 so that the mirror surface 602 of the rear-view mirror 600 has an angle with respect to a surface perpendicular to the vehicle bottom surface or the like. Therefore, when the head up display 10 is attached to the rear-view mirror 600, the substrate housing portion 100 also has an angle with respect to a surface that is parallel to the vehicle bottom surface or the like in association with the inclination of the rear-view mirror 600.

As a result of performing an experiment for the recognition of a virtual image presented in many vehicles and to various users by the combiner 400, the inventor of the subject application has confirmed by the experiment that, in most cases, an angle formed by the mirror surface 602 and a reference surface 212 of the optical unit main body 210 becomes approximately 100 degrees by adjusting the respective angles of the combiner 400 and the optical unit 200 such that the combiner 400 and the optical unit 200 are located at a position where the user can recognize the virtual image without distortion when the head up display 10 is placed such that the longitudinal direction of the rear-view mirror 600 and the longitudinal direction of the substrate housing portion 100 are in the same direction.

The "reference surface" of the optical unit main body 210 in this case is an angle measurement reference surface used as a reference for measuring the inclination of the optical unit main body 210 with respect to the mirror surface 602 of the rear-view mirror 600. An example of the reference surface 212 is a plane including an optical axis of the optical unit main body 210 or a plane parallel to the plane. Another example of the reference surface 212 is a first main body surface 221, which is a lower surface when the head up display 10 is attached for a right steering wheel, or a second main body surface 222, which is a surface that is opposite to the first main body surface 221, or a plane that is parallel to those surfaces. The "reference surface" of the optical unit main body 210 may be set to be a reference surface of the optical unit 200.

In view of the above experimental result, the head up display 10 according to the embodiment is designed such that an optimal video image without distortion can be presented when the angle formed by the mirror surface 602 and the reference surface 212 is a predetermined reference angle under the condition where the head up display 10 is attached to the rear-view mirror 600 using the attachment member 500, attachment plates 571 and 581, and the like such that the longitudinal direction of the rear-view mirror 600 and the longitudinal direction of the substrate housing portion 100 are in the same direction. More specifically, an optical unit forming the optical system of the head up display 10 is designed such that an optical video image can be presented under the above-stated condition.

The "optical unit forming the optical system of the head up display 10" in this case is a system that generates and projects image display light based on an image signal output by the circuit substrate 111 housed in the substrate housing portion 100. More specifically, the system represents all or a predetermined part of the light source 231, the collimate lens 232, the UV-IR (UltraViolet-Infrared Ray) cut filter 233, the polarizer 234, the fly-eye lens 235, the reflecting mirror 236, the field lens 237, the wire grid polarization beam splitter 238, the quarter-wave plate 239, the analyzer 241, and the projection lens group 242 in the optical unit main body 210, the first projection mirror 351, the second projection mirror 352, and the intermediate image screen 360 in the projection unit 300, and the combiner 400.

Also, the "predetermined reference angle" is an angle formed by the mirror surface 602 and the reference surface 212 and an angle assumed as a standard for design at the time of the optical designing of the head up display 10. The "predetermined reference angle" may be determined by an experiment so that an optimal video image without distortion can be presented in many vehicles and to various users. An example of the predetermined reference angle is an obtuse angle and is more specifically 100 degrees. Also, the "predetermined reference angle" is shown using Ø in FIG. 7.

As described, in the head up display 10 according to the embodiment, an optical part forming an optical system is designed using, as a reference, a condition when the angle formed by the mirror surface 602 and the reference surface 212 becomes the reference angle. Thus, the optical designing is optimally achieved in accordance with the inclination of the rear-view mirror 600 that can be expected under a normal state of usage. When the head up display 10 according to the embodiment is attached such that an optimal video image without distortion can be presented in many vehicles and to various users, the optical unit 200 is held near horizontal in most cases. Such attachment prevents the optical unit 200 from facing the direction of the user. Thus, a feeling of oppression the user, who is the driver, has can be reduced.

The substrate housing portion 100 attached via the attachment member 500 (not shown) is fixedly installed on the rear-view mirror 600 directed to the user as described above in FIG. 7. Therefore, the same change in direction as in the rear-view mirror 600 is made to the substrate housing portion 100. On the other hand, as described above, the optical unit 200 including the projection unit 300 and the combiner 400 are rotatable in an integral manner by the hinge 113 with respect to the substrate housing portion 100. Therefore, regardless of an angle of adjustment of the rear-view mirror 600, the driver can adjust the combiner 400 to a visually-recognizable position without creating distortion in an image (virtual image) projected onto the combiner 400.

Figure 8:
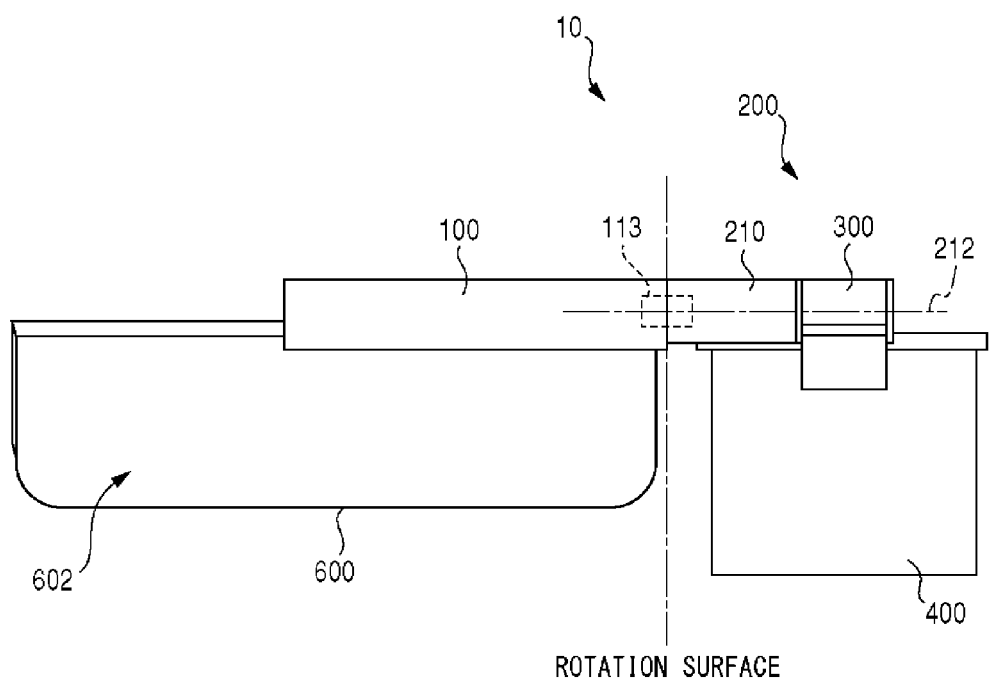
FIG. 8 is a front view of the head up display attached to the rear-view mirror.

FIG. 8 is a view of the head up display 10 attached to the rear-view mirror 600 viewed by means of a field of view from the side of the mirror surface 602 of the rear-view mirror 600. As shown in the figure, a rotation surface of the hinge 113, which is a boundary surface between the substrate housing portion 100 and the optical unit 200 formed by the rotation of the hinge 113, is a surface that is perpendicular to the mirror surface 602 and that is parallel to the projection axis 320 and is therefore located at a position where the rotation surface does not cross the rear-view mirror 600. Therefore, the optical unit 200 and the combiner 400 can be rotated in an integral manner without coming into contact with the rear-view mirror 600 while the substrate housing portion 100 is fixed to the rear-view mirror 600.

Figure 9:
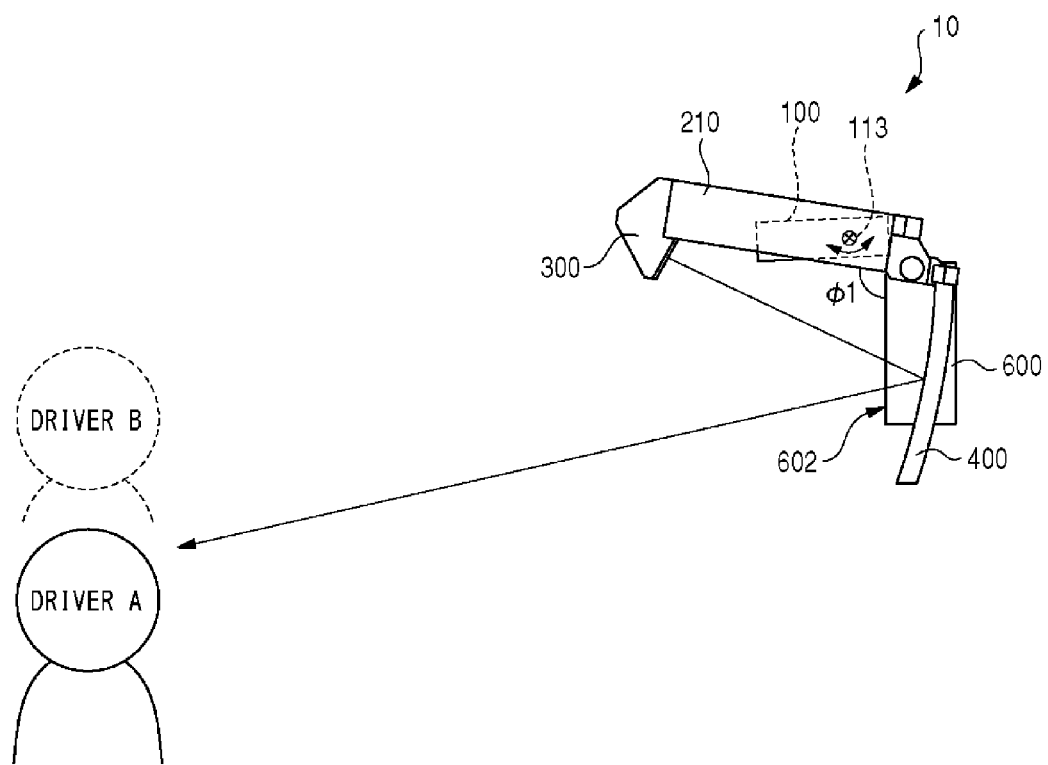
FIG. 9 is a diagram illustrating a visually recognizable region of an image (virtual image) projected onto a combiner.
Figure 10:
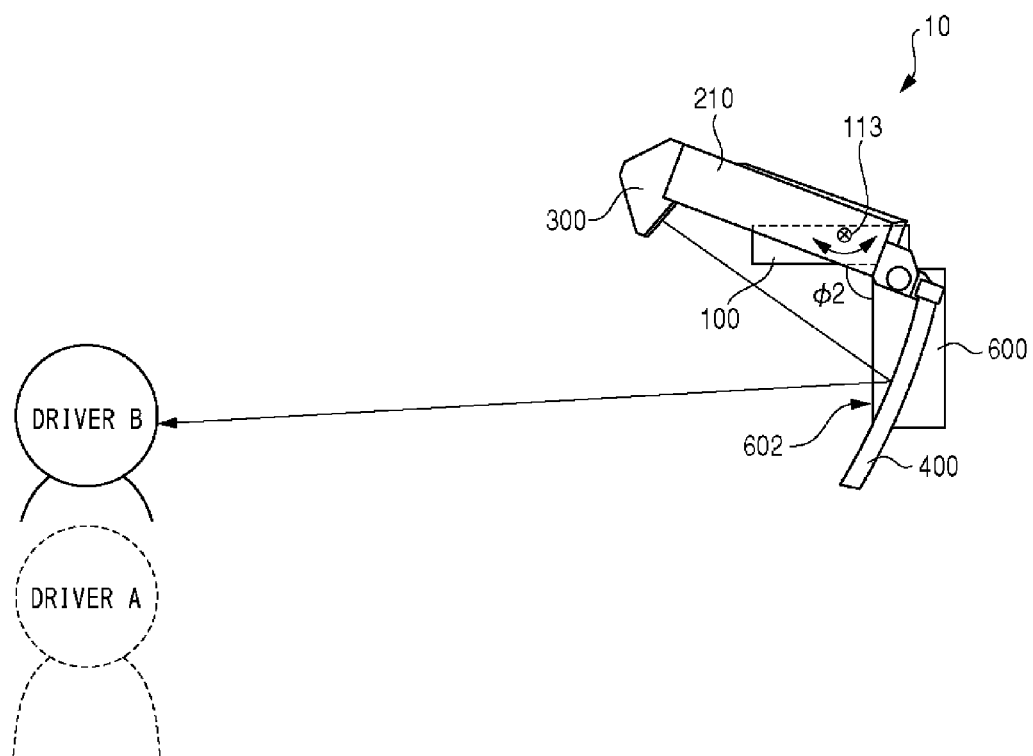
FIG. 10 is a diagram illustrating a visually recognizable region of an image (virtual image) projected onto the combiner.

FIGS. 9 and 10 are diagrams illustrating a space where an image (virtual image) projected on the combiner 400 is visually recognizable and diagrams for explaining a change in the driver's direction of observing the optical unit 200 and the combiner 400 rotated by the above-described hinge 113. For example, when a head up display 10 attached to the same vehicle is used by a driver A and a driver B whose eye level is higher than that of the driver A, an angle of adjustment by the hinge 113 made for use by the driver A is angle Ø1 as shown in FIG. 9. This angle allows the driver A to visibly recognize the image (virtual image) projected on the combiner 400 without distortion. On the other hand, an angle of adjustment by the hinge 113 made for use by the driver B is Ø2, which is larger than the angle Ø1, as shown in FIG. 10. This angle Ø2 allows the driver B to visually recognize the image (virtual image) projected on the combiner 400 without distortion. This rotation of the hinge 113 from the angle Ø1 to the angle Ø2 changes a position at which the image is displayed as a virtual image by the combiner 400 in a direction parallel to a straight line formed mainly by the rotation surface and the mirror surface 602 of the rear-view mirror 600.

Therefore, even when the head up display 10 according to the present embodiment is installed in a small space in a vehicle, both the projection direction of image display light from the projection unit 300 and the combiner 400 on which the image display light is projected can be adjusted in a space-saving manner. Also, since only the optical unit 200 and the combiner 400 can be moved in an integral manner without moving the entire head up display 10, a space that allows a display image to be visually recognized can be easily adjusted.

[Rotation and Detachment of Combiner and Projection Unit]

Figure 11:
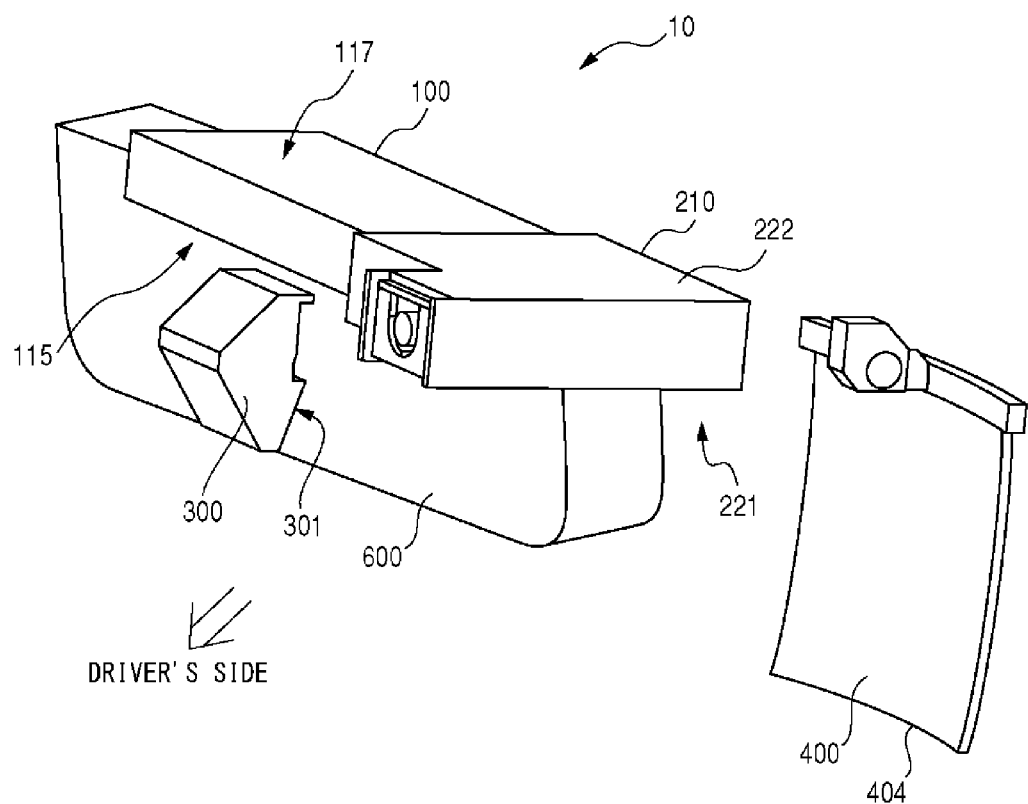
FIG. 11 is a diagram illustrating a state where a projection unit and a combiner are removed in a head up display attached for a right steering wheel vehicle.
Figure 12:
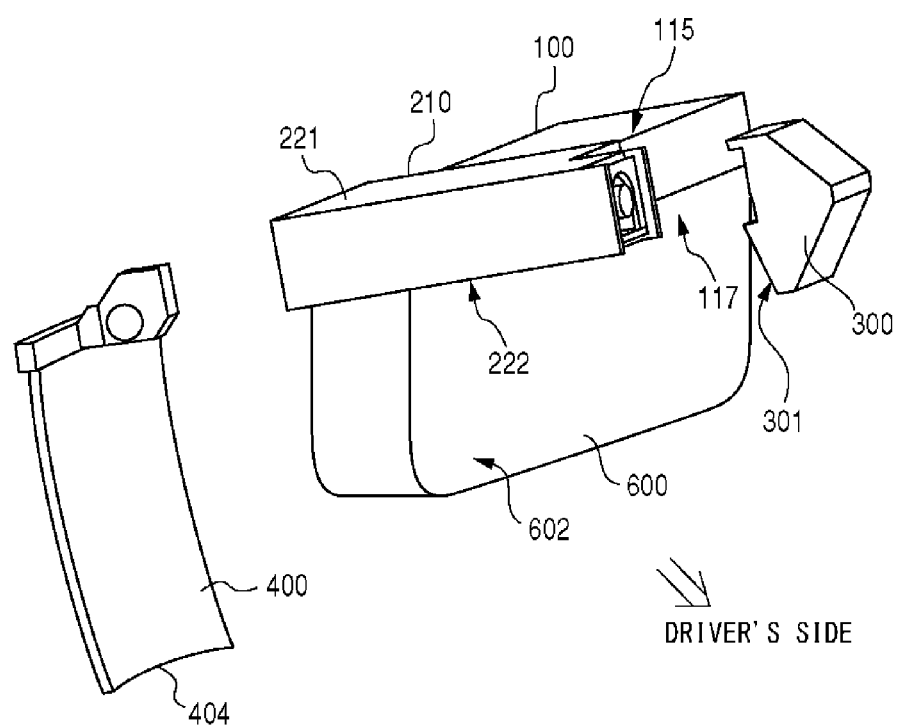
FIG. 12 is a diagram illustrating a state when a substrate housing portion is replaced for a left steering wheel vehicle.
Figure 13:
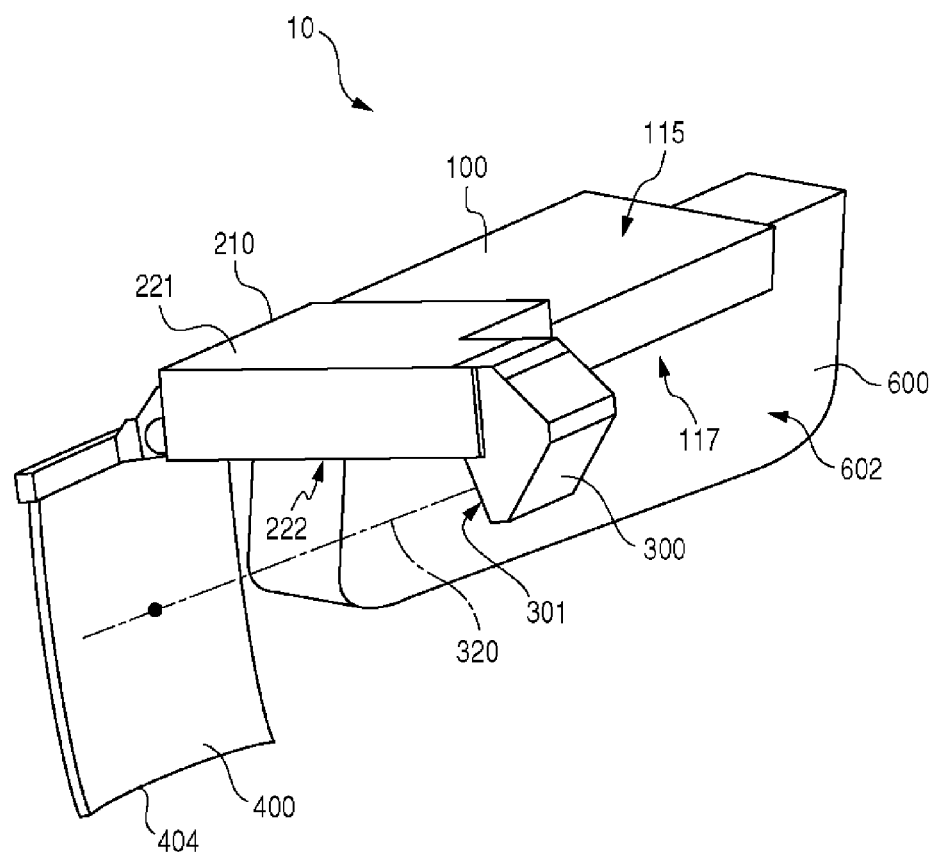
FIG. 13 is a diagram illustrating a head up display replaced for a left steering wheel vehicle.

FIGS. 11, 12, and 13 are diagrams for explaining a case where the head up display 10 is attached at an attachment position corresponding to a right steering wheel vehicle and a case where the head up display 10 is attached at an attachment position corresponding to a left steering wheel vehicle. FIG. 11 shows a state where the projection unit 300 and the combiner 400 are removed from the optical unit main body 210 in the head up display 10 attached to a right steering wheel vehicle. In the head up display 10 attached to a right steering wheel vehicle, the optical unit main body 210 and the combiner 400 are placed on the right side, which is a driver's side of the rear-view mirror 600, viewed from the driver. The substrate housing portion 100 has the first attachment surface 115 and the second attachment surface 117 opposite to the first attachment surface 115 and is attached to the rear-view mirror 600 in a direction such that the first attachment surface 115 is in contact with the attachment member 500 (not show). Also, the optical unit main body 210 has the first main body surface 221 on the same side as the first attachment surface 115 of the substrate housing portion 100. A surface of the optical unit main body 210 opposite to the first main body surface 221 is the second main body surface 222.

The head up display 10 shown in FIG. 11 is attached to the rear-view mirror 600 in an arrangement state where the first attachment surface 115 of the substrate housing portion 100 and the first main body surface 221 of the optical unit main body 210 are directed downward and the projection port 301 of the projection unit 300 and a lower end 404 of the combiner 400 are on the side of the first main body surface 221. Therefore, the projection axis 320 is on the side of the first main body surface 221 (see FIG. 1).

FIG. 12 illustrates the head up display 10 attached to a left steering wheel vehicle. As shown in this figure, when the head up display 10 is attached to a left steering wheel vehicle, the head up display 10 is attached to the rear-view mirror 600 in a direction such that the second attachment surface 117 is in contact with the attachment member 500 (not show) while the second attachment surface 117 of the substrate housing portion 100 is directed downward. In this case, the optical unit main body 210 and the combiner 400 are placed on the left side, which is a driver's side of the rear-view mirror 600, viewed from the driver.

FIG. 13 is a diagram illustrating the head up display 10 attached to a left steering wheel vehicle. The head up display 10 is attached to the rear-view mirror 600 in an arrangement state where the second attachment surface 117 of the substrate housing portion 100 and the second main body surface 222 of the optical unit main body 210 are on the same downside and the projection port 301 of the projection unit 300 and the lower end 404 of the combiner 400 are on the side of the second main body surface 222.

As shown in FIG. 11 and FIG. 13, the projection unit 300 and the combiner 400 can be placed with respect to the optical unit main body 210 in either state where the projection port 301 and the lower end 404 are located on the first main body surface 221 of the optical unit main body 210 or where the projection port 301 and the lower end 404 are located on the second main body surface 222 of the optical unit main body 210. Also, as shown in FIG. 11 and FIG. 12, it is also possible to remove the projection unit 300 and the combiner 400 from the optical unit main body 210 and change the respective directions of attachment. It is also possible to connect the projection unit 300 and the combiner 400 with the optical unit main body 210 by a rotating member and change the respective directions of attachment via the rotating member (diagrammatic representation is omitted). In other words, in the head up display 10, the projection unit 300 and the combiner 400 can be attached while the respective directions of attachment are changed with respect to the optical unit main body 210. By changing the directions of attachment, the placement of the projection port 301 emitting image display light projected on the combiner 400 from the projection unit 300 and the projection axis 320 related to the projection direction of the image display light can be on the side of the first main body surface 221 or on the side of the second main body surface 222.

As shown in FIG. 13, even when the second attachment surface 117 is on the downside, the projection unit 300 can be placed in a state where the projection port 301 of the projection unit 300 is on the side of the second main body surface 222 of the optical unit main body 210, and image display light is thus projected downward from the optical unit main body 210. Therefore, the projection axis 320 is on the side of the second main body surface 222.

As described above, the projection unit 300 and the combiner 400 can be placed with respect to the optical unit main body 210 in either state where the projection port 301 and the lower end 404 are located on the first main body surface 221 of the optical unit main body 210 or where the projection port 301 and the lower end 404 are located on the second main body surface 222 of the optical unit main body 210. In other words, the projection unit 300 and the combiner 400 can be attached at a position where the projection port 301 of the projection unit 300 and the lower end 404 of the combiner 400 are changed 180 degrees with respect to either one of the surfaces (the first main body surface 221 or the second main body surface 222) of the optical unit main body 210. The respective positions of attachment of the projection unit 300 and the combiner 400 with respect to the optical unit main body 210 can be changed, and the respective positions of attachment of the projection unit 300 and the combiner 400 with respect to the first attachment surface 115 (or the second attachment surface 117) of the substrate housing portion 100 can be changed.

If the projection unit 300 and the combiner 400 are attached while the respective positions of attachment are changed 180 degrees with respect to the optical unit main body 210, the direction of an image (virtual image) that is visually recognized on the combiner 400 may change 180 degrees compared to the direction before the change of the attachment. In the head up display 10, the circuit substrate 111 outputs an image signal in which the direction of an image is changed from the direction before the change of the attachment, by detection of the respective attachment positions and directions of the projection unit 300 and the combiner 400 or by setting made by the driver via an operation unit such as a remote controller or the like.

For example, in the head up display 10 attached as shown in FIG. 11, by changing the direction of an image output at an attachment position where the projection port 301 of the projection unit 300 is on the side of the first main body surface 221 and the direction of an image output at an attachment position where the projection port 301 of the projection unit 300 is on the side of the second main body surface 222 by 180 degrees from each other, an image of the same direction can be visually recognized even when the attachment position of the projection unit 300 with respect to the optical unit main body 210 is changed 180 degrees.

With this, the image display element 240 changes the direction of an image (upward and downward and leftward and rightward by 180 degrees or the like) according to the attachment position of the projection unit 300 so as to output the image, and the driver can thus visually recognize the image (virtual image) even when the attachment position is changed.

Also, even when the head up display 10 is attached to a left steering wheel vehicle, the rotation surface of the hinge 113 is located at a position where the rotation surface does not cross the rear-view mirror 600 in the same way as in the case shown in FIG. 8. Therefore, the optical unit 200 and the combiner 400 can be rotated in an integral manner without coming into contact with the rear-view mirror 600 while the substrate housing portion 100 is fixed to the rear-view mirror 600.

[Rear-View Mirror Attachment Member]

Figure 14:
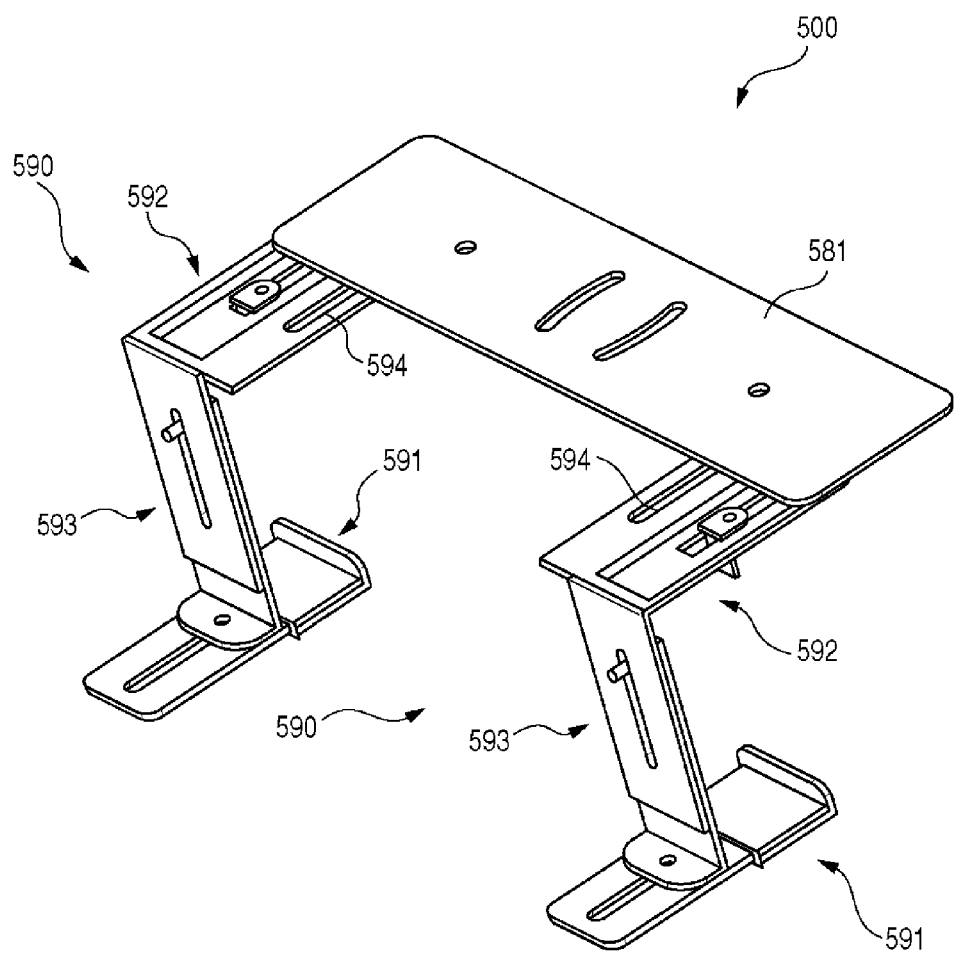
FIG. 14 is a perspective view showing an attachment member for attaching a substrate housing portion to a rear-view mirror.

A detailed description is now given regarding the attachment member 500 for attaching the head up display 10 to the rear-view mirror 600. FIG. 14 illustrates the attachment member 500 for attaching the head up display 10 to the rear-view mirror 600. As shown in the figure, the attachment member 500 has a pair of holding portions 590 fixed to the rear-view mirror 600 in such a manner that the holding portions 590 hold the rear-view mirror 600, and an attachment plate 581 for attaching the pair of holding portions 590 and the substrate housing portion 100. The holding portions 590 has two lower side holding mechanism portions 591 having a hook portion that is slidable in forward and backward directions in order to hold a lower end portion of the rear-view mirror 600, two upper side holding mechanism portions 592 having a hook portion that is slidable in the forward and backward directions in order to hold an upper end portion of the rear-view mirror 600, a height adjusting portion 593 that is slidable in the upward and downward directions in order to hold the rear-view mirror 600 in the upward and downward directions from behind, and a position adjustment groove 594, which is a long hole for performing position adjustment on the holding portions 590 of the attachment plate 581, on the upper surface on which the attachment plate 581 is to be placed. The attachment plate 581 is placed on the respective upper surfaces of the pair of the holding portions 590 across the upper surfaces and is attached while a pair of projections 584 is engaged with the position adjustment groove 594.

Figure 15:
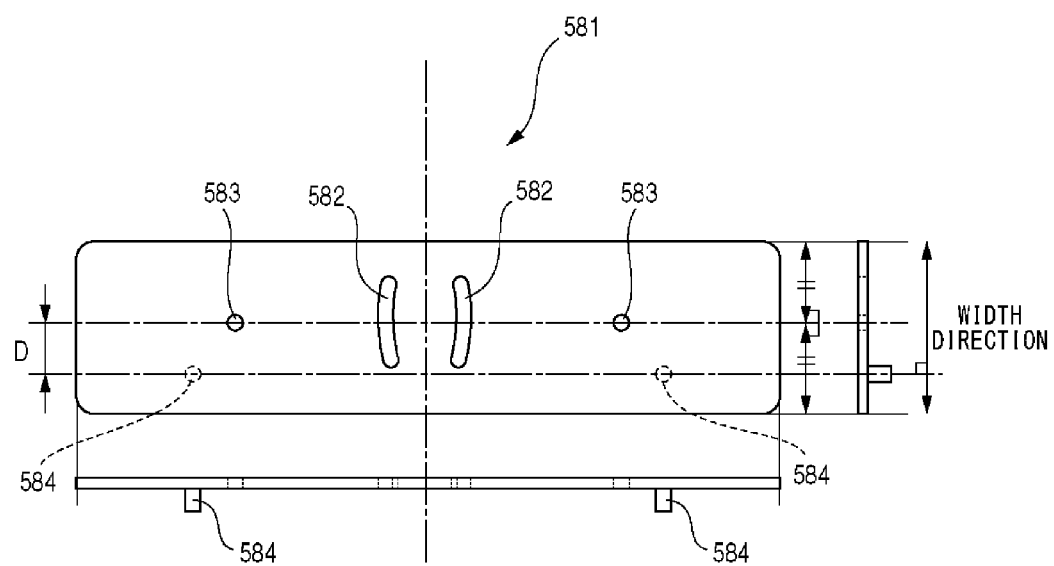
FIG. 15 is a trihedral figure of an attachment plate of the attachment member shown in FIG. 14.

FIG. 15 is a trihedral figure of the attachment plate 581 of the attachment member 500 shown in FIG. 14. As shown in this figure, the attachment plate 581 is formed of an approximately rectangular plate-like member as a whole, and a flat surface that is an attachment surface is provided with circular arc holes 582, which are a pair of circular-arc shaped holes of different directions, central holes 583, which are a pair of holes formed at respective central positions of circles on which the respective circular arcs of the circular arc holes 582 are based, and the projections 584 on the back side for allowing the attachment plate 581 to be slidable in the longitudinal direction of the position adjustment groove 594 by attaching the attachment plate 581 to the holding portions 590 such that the projections 584 become engaged with the position adjustment groove 594 formed on the holding portions 590.

The central holes 583 are provided in the center of a width direction, which is a direction that is perpendicular to a straight line that connects the pair of projections of the attachment plate 581. On the other hand, the pair of projections 584 are not attached in the center of the width direction described previously but are placed at a position that is apart from the center by a certain distance (offset D) in the width direction. With this, a sliding range can be changed to be widely different in a first state where the attachment plate 581 is attached such that the projections 584 are located closer to the height adjusting portion 593 than to the respective central holes 583 and a second state where the attachment plate 581 is used while switching two ends thereof located in the width direction with each other by rotating the attachment plate 581 by 180 degrees using a direction perpendicular to the surface of the attachment plate 581 as an axis from the first state while the pair of projections 584 are facing downward, and an adjustable range of the position of the substrate housing portion 100 can thus be increased. Note that the second state is a state where the attachment plate 581 is attached such that the projections 584 are located farther away from the height adjusting portion 593 than from the respective central holes 583. Since a distance between a rear-view mirror 600 and a windshield (a front windshield) of a vehicle varies depending on the type of the vehicle, by arranging a pair of projections 584 away from the center by the offset D, the degree of freedom of a position in the forward and backward directions at which a head up display 10 is fixed with respect to the rear-view mirror 600 is increased, and the head up display 10 can thus be installed in various vehicles. Also, by providing a plurality of holding portions 590 (a pair in the case of the present embodiment), the head up display 10 can be installed in even more variety of vehicles.

Regarding a distance between the pair of holding portions 590, the pair of holding portions 590 can be arranged such that a distance between the two position adjustment grooves 594 is the same as a distance between the two projections 584 of the attachment plate 581. Alternatively, the pair of holding portions 590 can be arranged such that the distance between the two position adjustment grooves 594 becomes shorter than the distance between the two projections 584. Since the distance between the pair of projections 584 does not change, the attachment plate 581 is consequently attached in an oblique manner with this arrangement, and the attachment plate 581 can thus be attached with an angle changed with respect to the longitudinal direction of the position adjustment grooves 594. In other words, the attachment plate 581 and the substrate housing portion 100 can be attached at an angle by rotating the attachment plate 581 and the substrate housing portion 100 along a plane on the attachment plate 581. As described, by providing a plurality of holding portions 590 (a pair in the case of the present embodiment) and adjusting respective distances between the plurality of holding portions 590, even more variety of positions for attachment are possible.

When attaching the substrate housing portion 100, a surface of the attachment plate 581 (a surface on which the projections 584 are not provided) and the first attachment surface or the second attachment surface of the substrate housing portion 100 are arranged overlapping with each other, and setscrews 118 (fixing members) are inserted through a circular arc hole 582 and a central hole 583 located in the center of a circular arc of the circular arc hole 582 so as to fix the substrate housing portion 100 by screwing. At the time of screwing, the substrate housing portion 100 is movable around the central hole 583 on the surface of the attachment plate 581, and the direction of the substrate housing portion 100 obtained while a normal to the surface of the attachment plate 581 is used as an rotation axis is adjusted. Since the substrate housing portion 100, the optical unit 200, and the combiner 400 are rotated in an integral manner around the central hole 583 at this time, the driver can adjust an attachment angle, that is obtained while the normal to the surface of the attachment plate 581 is used as the rotation axis, to the position where the driver can visually recognize an image (virtual image) displayed on the combiner 400. The central angle of the circular arc of the circular arc hole 582 is set to be in a range that is sufficient for the driver to adjust the attachment angle to the position where the driver can visually recognize an image (virtual image) displayed on the combiner 400. Also, the central angle of the circular arc of the circular arc hole 582 is more preferably set to be in a range where the combiner 400 does not come in contact with the windshield.

Given that the center direction of the circular arc of the circular arc hole 582 is referred to as an inner side and that the direction opposite to the center direction of the circular arc is referred to as an outer side, the pair of the circular arc holes 582 are arranged in such a manner that the respective inner sides thereof face to each other in the present embodiment. However, depending on a position where the substrate housing portion 100 is fastened by a setscrew, the pair of the circular arc holes 582 may be arranged in such a manner that the respective outer sides thereof face to each other.

Figure 16:
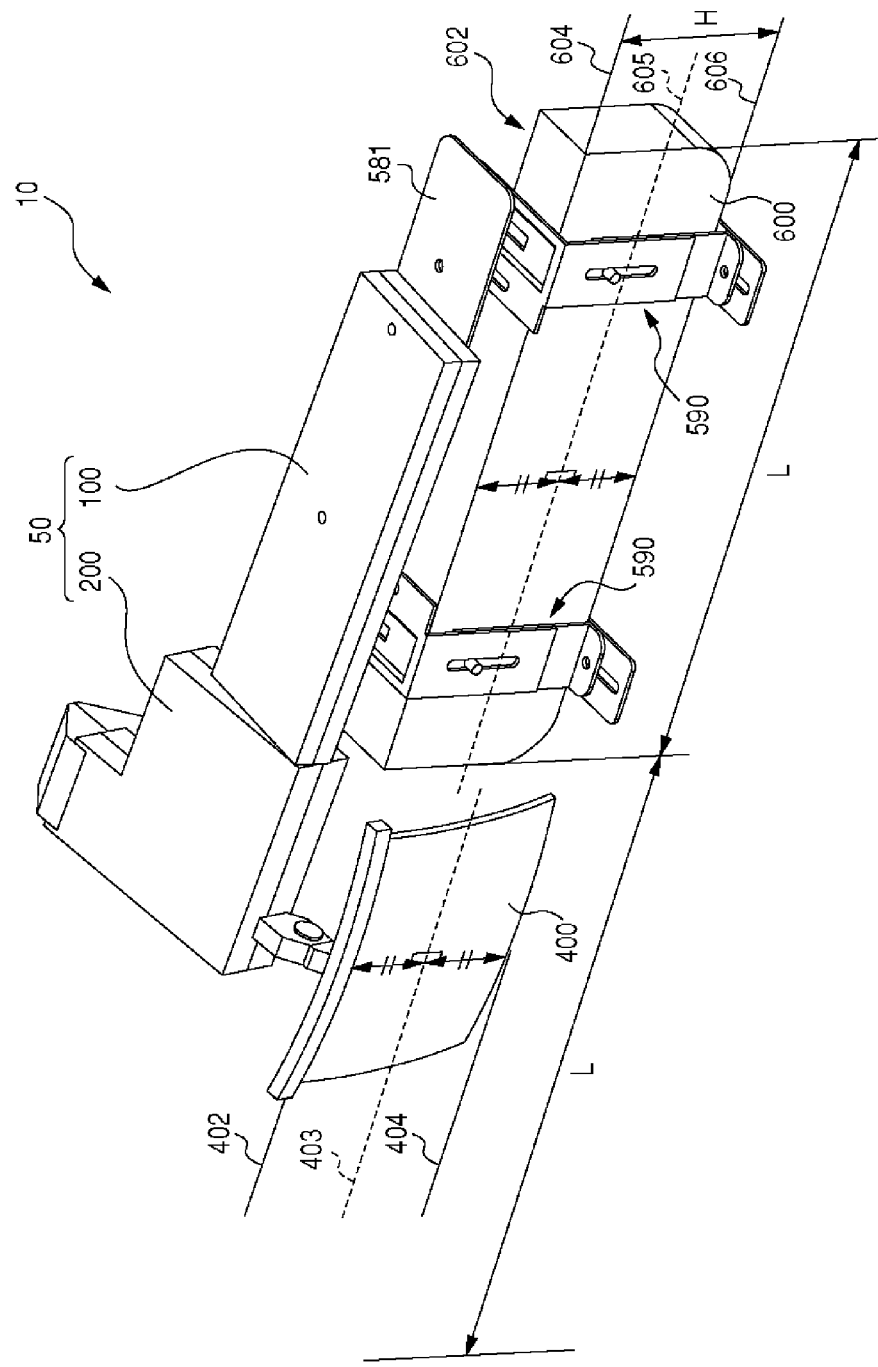
FIG. 16 is a perspective view showing a head up display attached to a rear-view mirror.

FIG. 16 illustrates the head up display 10 attached to the rear-view mirror 600. The holding portions 590 of the attachment member 500 each hold the upper end and the lower end of the rear-view mirror 600 from the back surface (surface with no mirror in this case) of the rear-view mirror 600 at two parts, and the attachment plate 581 is attached such that the position thereof in the longitudinal direction of the position adjustment grooves 594, which is mainly a direction perpendicular to the mirror surface of the rear-view mirror 600, by the projections 584 being engaged with the respective position adjustment grooves 594 formed on the upper side holding mechanism portions 592 of the respective holding portions 590. Also, the attachment plate 581 is fixed such that an angle thereof obtained while the normal to the surface of the attachment plate 581 is used as a rotation axis is adjustable.

Subsequently, an explanation is given using FIG. 16 regarding a relationship between the position of the rear-view mirror 600 and the position of the combiner 400. The explanation is given on the assumption that the longitudinal direction of the rear-view mirror 600 is parallel to a horizontal plane and that the mirror surface is perpendicular to the horizontal plane. Also, a line that passes through the center of the rear-view mirror 600 in the upward and downward directions and that is parallel to the transverse direction of the rear-view mirror 600 is referred to as a rear-view mirror center line 605. Also, a line that passes through the center of the combiner 400 in the upward and downward directions and that is parallel to the transverse direction of the combiner 400 is referred to as a combiner center line 403. In the present embodiment, the observation angle of the combiner 400 is adjustable, and the relative height of the combiner 400 with respect to the height of the rear-view mirror 600 changes with the adjustment of the observation angle of the combiner 400. The relative heights of the combiner 400 and the rear-view mirror 600 can be also said to be a difference between the height of the combiner center line 403 and the height of the rear-view mirror center line 605. For example, if the combiner center line 403 is located at a position higher than the rear-view mirror center line 605, it can be considered that the combiner 400 is located at a position relatively higher than the rear-view mirror 600. Also, the position condition of the combiner 400 explained in the following is preferably satisfied at all positions of the combiner 400 in a usage state (a state where an image projected can be visually recognized by the user). In other words, although the position condition is preferably satisfied at all possible observation angles of the combiner 400, a sufficient effect can be achieved at least as long as the position condition is satisfied when the combiner 400 has an average height of the possible relative height of the combiner 400 with respect to the height of the rear-view mirror 600. For example, if the relative height of the combiner 400 with respect to the height of the rear-view mirror 600 is adjustable from a position where the combiner center line 403 is higher than the rear-view mirror center line 605 by 5 cm to a position where the combiner center line 403 is lower than the rear-view mirror center line 605 by 5 cm, the position condition needs to be satisfied when the combiner center line 403 and the rear-view mirror center line 605 have the same height. Also, in a case of a configuration where the relative height of the combiner 400 with respect to the height of the rear-view mirror 600 is fixed by screwing or the like such that the relative height cannot be adjusted, in other words, in a case of a configuration where the relative height of the combiner 400 with respect to the height of the rear-view mirror 600 is fixed (such that the relative height is uniquely determined) with the attachment of the head up display 10 to the rear-view mirror 600 of a vehicle, the position condition of the combiner 400 explained in the following needs to be satisfied at the position where the relative height is fixed. As shown in FIG. 16, the rear-view mirror 600 has a length L in the transverse direction (the longitudinal direction) and a height H in the upward and downward directions.

First, an explanation is given regarding a preferred position condition of the combiner 400. In the present embodiment, an upper end 402 of the combiner 400 in the usage state is located higher than the rear-view mirror center line 605 of the rear-view mirror 600, and a lower end 404 of the combiner 400 is located lower than the rear-view mirror center line 605 of the rear-view mirror 600. By attaching the head up display 10 to the rear-view mirror 600 and by achieving an attachment structure where the combiner 400 is placed at such a position, the head up display 10 can be installed at an optimal position with a small displacement of a viewpoint at the time of viewing a display image.

Further, a configuration may be employed that allows the combiner center line 403 of the combiner 400 in the usage state has almost the same height as the rear-view mirror center line 605. By attaching the head up display 10 to the rear-view mirror 600 and by achieving an attachment structure where the combiner 400 is placed at such a position, the head up display 10 can be installed at an optimal position with an even smaller displacement of a viewpoint at the time of viewing a display image.

Also, regarding a case where the height of the combiner 400 in the upward and downward directions is larger than the height H of the rear-view mirror 600 in the upward and downward directions, a configuration may be employed where the upper end 402 of the combiner 400 in the usage state is located higher than the upper end 604 of the rear-view mirror 600 and where the lower end 404 of the combiner 400 is located lower than the lower end 606 of the rear-view mirror 600. By attaching the head up display 10 to the rear-view mirror 600 and by achieving an attachment structure where the combiner 400 is placed at such a position, the head up display 10 can be installed at an optimal position with an even smaller displacement of a viewpoint at the time of viewing a display image.

Such a position shown in the present embodiment is optimal. However, at least as long as the upper end 402 of the combiner 400 in the usage state is located higher than the lower end 606 of the rear-view mirror 600 or the lower end 404 of the combiner 400 is located lower than the upper end 604 of the rear-view mirror 600, the head up display 10 can be installed at a preferred position with a small displacement of a viewpoint at the time of viewing a display image. In the present embodiment, a state where the combiner 400 is at the lateral side of the rear-view mirror 600 needs to be a state where the position of the combiner 400 in the transverse direction is a position that allows a display image to be visually recognized from a seat of the vehicle while satisfying a condition for exerting this above-described effect. In other words, it is only necessary that a display image projected on the combiner 400 is not blocked by the rear-view mirror 600.

In addition to the above-described position condition, the position of the combiner 400 in the transverse direction is more preferably arranged in a range of up to the length L of the rear-view mirror 600 from an end in the transverse direction (lateral end) of the rear-view mirror 600 since the rear-view mirror 600 and the combiner 400 are not too far away from each other with a small displacement of a viewpoint.

Figure 17:
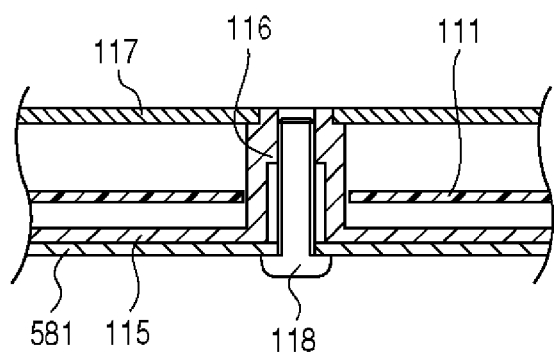
FIG. 17 is a cross-sectional view of a setscrew portion when a first attachment surface of a substrate housing portion is attached such that the first attachment surface is in contact with an attachment plate.
Figure 18:
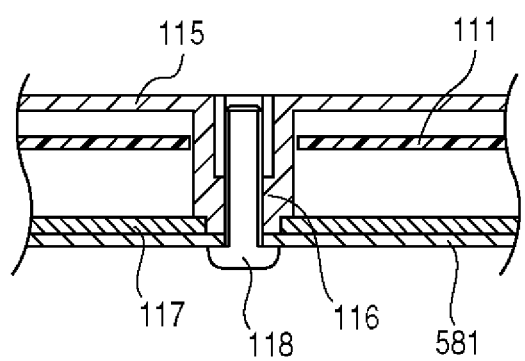
FIG. 18 is a cross-sectional view of a setscrew portion when a second attachment surface of the substrate housing portion is attached such that the second attachment surface is in contact with the attachment plate.

FIG. 17 is a cross-sectional view of a portion including a setscrew 118 when the first attachment surface 115 of the substrate housing portion 100 is attached such that the first attachment surface 115 is in contact with the attachment plate 581. FIG. 18 is a cross-sectional view of a portion including a setscrew 118 when the second attachment surface 117 of the substrate housing portion 100 is attached such that the second attachment surface 117 is in contact with the attachment plate 581. In general, a space between the upper side of the rear-view mirror 600 and a ceiling is extremely small. Thus, a setscrew 118 is tighten only from below for a case where the first attachment surface 115 is in contact with the attachment plate 581 and for a case where the second attachment surface 117 is in contact with the attachment plate 581. Also, since the substrate housing portion 100 is designed to be as thin as possible, the circuit substrate 111 has a through hole at a fixing position by the setscrew 118, allowing for fixation by a longer screw. An insert nut 116, which is a fixing member engagement unit that extends to the second attachment surface 117, is formed on the first attachment surface 115, and a through hole is formed at a corresponding position on the second attachment surface 117. Thus, the setscrew 118 is fixed in engagement with the same insert nut 116 for a case where the first attachment surface 115 is in contact with the attachment plate 581 and for a case where the second attachment surface 117 is in contact with the attachment plate 581. Therefore, the substrate housing portion 100 can be installed even in a small area between the rear-view mirror 600 of the vehicle and the ceiling. Therefore, the position and the angle can be adjusted in a space-saving manner in the head up display 10 according to the present embodiment.

Figure 19:
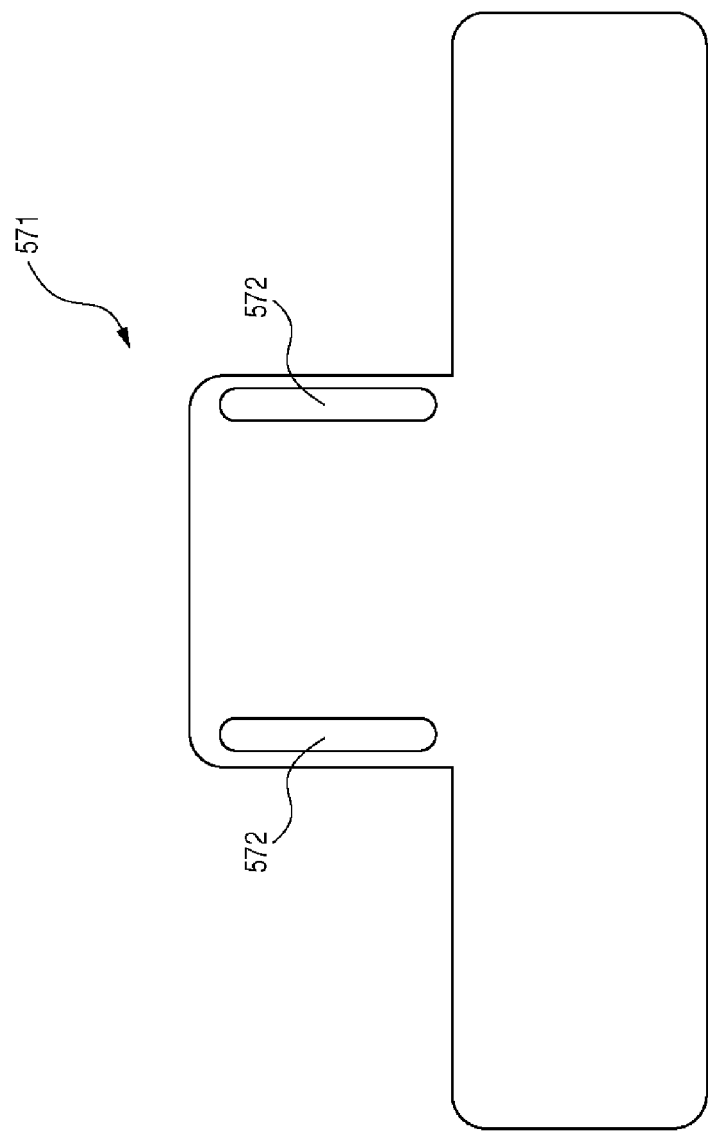
FIG. 19 is a diagram illustrating an exemplary variation of the attachment plate.

FIG. 19 illustrates an attachment plate 571, which is an exemplary variation of the attachment plate 581. The attachment plate 571 has a pair of linear straight-line hole portions 572 that extend in one direction, which are used when attaching the substrate housing portion 100. Setscrews 118 are inserted through both of the straight-line hole portions 572 even when an attachment surface of the attachment plate 571 faces an attachment surface of either of the first attachment surface 115 and the second attachment surface 117 of the substrate housing portion 100. In the attachment plate 571, by attaching the substrate housing portion 100 while changing respective attachment positions in the longitudinal direction of both of the pair of the straight-line hole portions 572, the position of the substrate housing portion 100 in the longitudinal direction can be adjusted. In this case, each hole of the straight-line hole portions 572 is formed to have a width that is sufficiently larger than the screw diameter of a setscrew 118. With this, the direction of the substrate housing portion 100 with the normal to the surface of the attachment plate 581 of the substrate housing portion 100 being used as an rotation axis can be adjusted by changing one of the attachment positions in the longitudinal direction of the pair of the straight-line hole portions 572. The respective lengths and widths of the straight-line hole portions 572 are determined in a range where the combiner 400 does not come in contact with the windshield.

As described, although a pair of long holes that are circular-arc shaped are used in the case of above-described attachment plate 581, the direction of the substrate housing portion 100 can be freely adjusted even when a pair of linear long holes are used as in the case of the attachment plate 571, which is an exemplary variation of the attachment plate 581. In modes explained using FIGS. 14 through 19, examples are shown where the substrate housing portion 100 and the optical unit 200 are formed separately. However, the same can apply even for an image generation unit 50 (FIG. 16) where the substrate housing portion 100 and the optical unit 200 are not formed separately. In the modes explained using FIGS. 14 through 19, two position adjustment grooves 594 are used. Alternatively, one or more grooves having a function of a position adjustment may be used.

[Combiner Storage]

Figure 20:
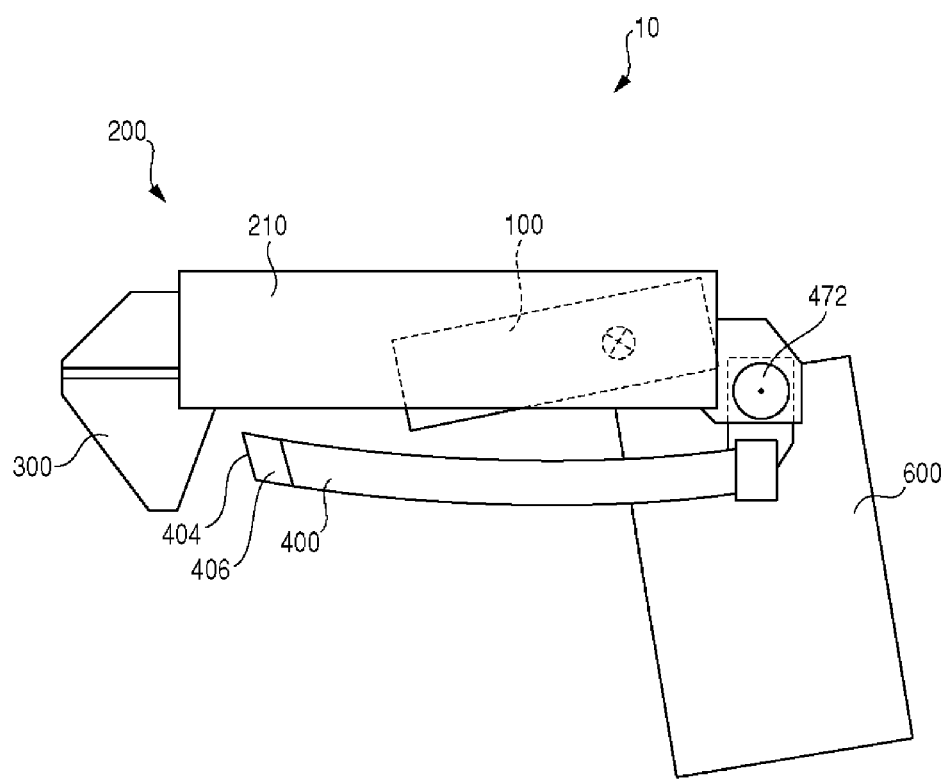
FIG. 20 is a lateral view showing a state where a combiner is folded by a storage hinge.
Figure 21:
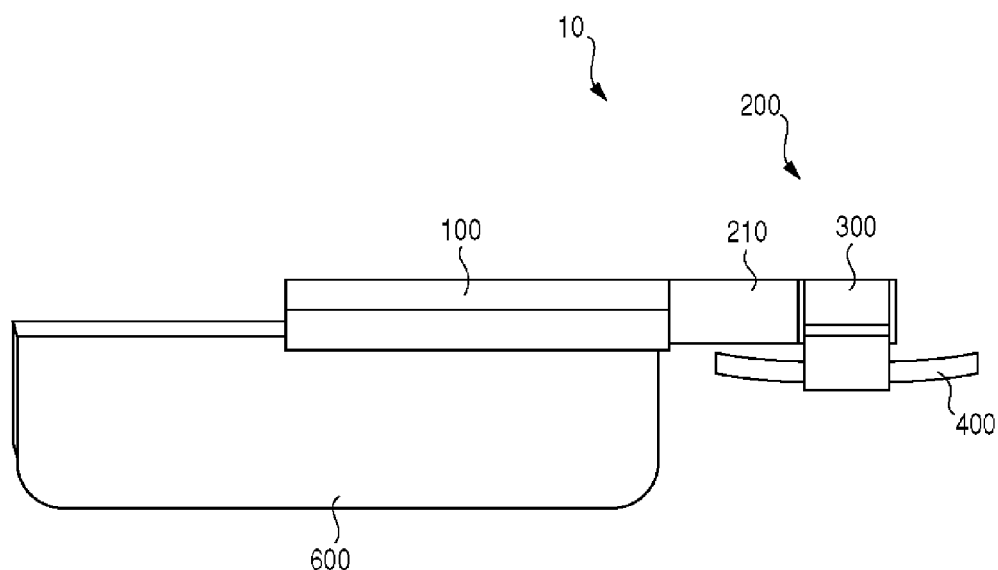
FIG. 21 is a front view showing a state where the combiner is folded by the storage hinge.

FIGS. 20 and 21 are a lateral view and a front view showing a state where the combiner 400 is placed at a storage position by a storage hinge 472, respectively. As shown in FIGS. 20 and 21, the combiner 400 is rotated by the storage hinge 472, which is a rotating unit of the combiner 400, for storage so as to face a housing surface of the optical unit 200, i.e., a housing surface of the optical unit main body 210 such that, for example, the combiner 400 overlaps the housing surface. In this case, the projection unit 300 is located on an opposite side from a side on which the combiner 400 is attached across the housing surface, and a length from the rotation center of the storage hinge 472 to the lower end 404, which is an end of the combiner 400 that is the farthest from the rotation center, is shorter than the length of the optical unit main body 210. The lower end 404 is located more to the side of the storage hinge 472 than the projection unit 300. Also, the height of the optical unit main body 210 from the housing surface is shorter than the height of the projection unit 300 from the housing surface. Therefore, when the head up display 10 is not being used, by storing the combiner 400 by the storage hinge 472, the combiner 400 can be placed at a position where the combiner 400 does not give a feeling of oppression to the driver compared to when the combiner 400 is being used (a position where the combiner 400 does not come into the driver's field of vision compared to when the combiner 400 is being used). Also, by storing the combiner 400 by rotating the combiner 400 using the storage hinge 472, sunlight can be prevented by the ceiling of the vehicle and the optical unit main body 210, and the deterioration of the combiner 400 can thus be prevented. Further, the storage hinge 472 stops at an angle formed when the combiner 400 is used. Thus, when start using the combiner 400 again after storing the combiner 400 by rotating the combiner 400 by the storage hinge 472, the driver can start using the combiner 400 without adjusting the position again. Transparent rubber 406 may be attached at a corner portion on the side of the lower end 404 of the combiner 400. Even when the combiner 400 is stored by the storage hinge 472 by picking the rubber 406, adhesion of dirt or the like to the combiner 400 can be prevented. Being transparent, the rubber 406 hardly blocks the field of view of the driver.

The attachment is made on the back side of the rear-view mirror 600. Alternatively, the attachment may be made to a post of the rear-view mirror 600 or may be made on the front side, which is the mirror surface 602. In this case, an alternative mirror may be placed on a surface of the display device for vehicle at a position corresponding to the mirror surface 602.

Also, in the above-described embodiment, as long as the rear-view mirror 600 is a mirror that can be used to check behind the vehicle in the vehicle, the position or the like of the mirror inside the vehicle is not limited. Also, the head up display 10 is attached to the rear-view mirror 600. Alternatively, the head up display 10 may be placed on the dashboard for use. A display device for vehicle may be realized by placing a display device such as a liquid crystal display device or an organic EL display device at the position of the combiner 400.

[Types of Intermediate Image Screen]

As described above, the intermediate image screen 360 images an image generated by the image display element 240 so as to generate a real image. In this case, methods for realizing the intermediate image screen 360 include at least two methods, "transmission-type" and "reflection-type" methods.

In a "transmission-type" intermediate image screen 360, video light that has entered one surface of the screen passes through the screen and is emitted from the other surface of the screen. On the other hand, in a "reflection-type" intermediate image screen 360, video light that has entered one surface of the screen is reflected near the other side of the screen and is emitted again from the surface on which the video light has entered. In the following, a "transmission-type" intermediate image screen is stated as a transmission-type intermediate image screen 361, a "reflection-type" intermediate image screen is stated as a reflection-type intermediate image screen 362, and both of the screens are collectively referred to as intermediate image screens 360 when the screens are not particularly differentiated in the subject specification. In the following, an explanation is given of a transmission-type intermediate image screen 361 in reference to figures.

[Transmission-Type Intermediate Image Screen]

In a transmission-type screen used in a conventional display device such as a projector used indoors (hereinafter, referred to as a "transmission-type screen for regular uses"), which is not a display device for vehicle, a gain is low making the screen dark, and a viewing angle is wide. Therefore, a transmission-type screen for regular uses is not adequate for use in a head up display as a display device for vehicle. On the other hand, when a diffusion sheet with a haze value (cloudiness) that is lower than that of a transmission-type screen for regular uses is used, a hot spot of a light source becomes too bright, and brightness distribution becomes too large. Thus, a video image becomes hard to see.

In order to overcome these problems, a transmission-type intermediate image screen has been developed that projects a video image on an appropriate transmission-type high-gain diffusion film or diffusion plate with an light distribution. However, a transmission-type intermediate image screen for a head up display is expected to show, on a combiner 400 or a windshield, a real image that is imaged on the screen so as to allow the user, who is the driver, to recognize an enlarged virtual image of the real image. Therefore, a transmission-type intermediate image screen for a head up display is required to have an extremely small screen size and a high resolution compared to a transmission-type screen for regular uses.

Figure 22A:
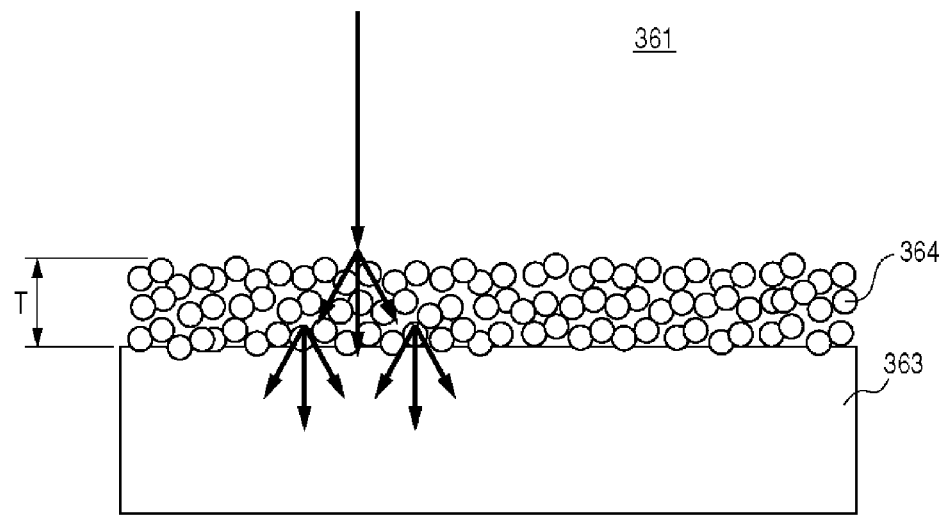
FIGS. 22A-22B are cross-sectional views schematically illustrating a cross-sectional surface of a transmission-type intermediate image screen according to an embodiment.
Figure 22B:
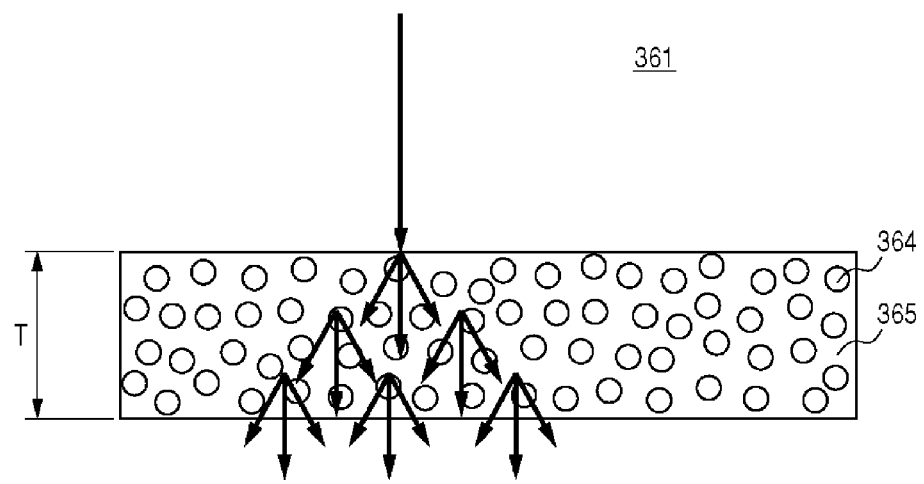

FIGS. 22A-22B are cross-sectional views schematically illustrating a cross-sectional surface of a transmission-type intermediate image screen 361 according to the embodiment. More specifically, FIG. 22A illustrates a cross-sectional view of a transmission-type intermediate image screen 361 in which a diffusion layer is formed by applying bead diffusion materials 364 on aplastic base 363, and FIG. 22B illustrates a cross-sectional view of a transmission-type intermediate image screen 361 in which a diffusion layer is formed including bead diffusion materials 364 in an acrylic base material 365.

In examples of a transmission-type intermediate image screen 361 shown in FIGS. 22A and 22B, a haze value is 84 to 90 percent in both examples, and highly transparent beads for optical use having a diameter of 10 micrometer or less are used as diffusion materials. A transmission light distribution angle formed when parallel light is made incident on these transmission-type intermediate image screens 361 is a luminous intensity half-value angle of ±7.5 to 10 degrees. This transmission light distribution angle is a value measured by a variable-angle photometer GC5000L manufactured by Nippon Denshoku Industries Co., Ltd.

As shown in FIG. 22A, when applying the bead diffusion materials 364 on the plastic base 363, the bead diffusion materials 364 are fixed by a predetermined binder. However, if the thickness of the diffusion layer is approximately 50 micrometers or more, it is no longer necessary to reinforce the diffusion layer by the plastic shown in FIG. 22A. The thickness of the diffusion layer can be changed by including the bead diffusion materials 364 in the acrylic base material 365 as shown in FIG. 22B, when making the thickness of the diffusion layer to be approximately 50 micrometers or more.

As described above, the head up display 10 according to the embodiment presents a real image imaged by the transmission-type intermediate image screen 361 to the user, who is the driver, via the combiner 400. The head up display 10 according to the embodiment is based on the assumption that the user observes a video image of a size of about 10 inches approximately 1.7 to 2 meters ahead via the combiner 400. Under this condition, resolving power that allows the user having visual acuity of 2.0 to recognize a presented virtual image when the user views the presented virtual image is about 40 to 50 micrometers on the transmission-type intermediate image screen 361.

In general, a user having visual acuity of 2.0 is considered to have sufficient visual acuity, and most users are considered to have visual acuity of less than 2.0. Therefore, if the resolution of a real image imaged on the transmission-type intermediate image screen 361 is about 50 micrometers or less under the above condition, it can be considered that a video image having resolution that is sufficient for the user can be provided.

Also, the head up display 10 according to the embodiment is designed such that a viewing angle of a space where a virtual image presented by the combiner 400 is visually recognizable is ensured to have at least about ±10 degrees. Thus, as described above, a transmission-type intermediate image screen 361 is employed that has a transmission light distribution angle, which is a luminous intensity half-value angle of ±7.5 to 10 degrees.

It should be understood that the above specific numerical values are just examples, and a person skilled in the art should easily appreciate that these values can be freely changed based on usage scenes of the head up display 10.

Figure 23:
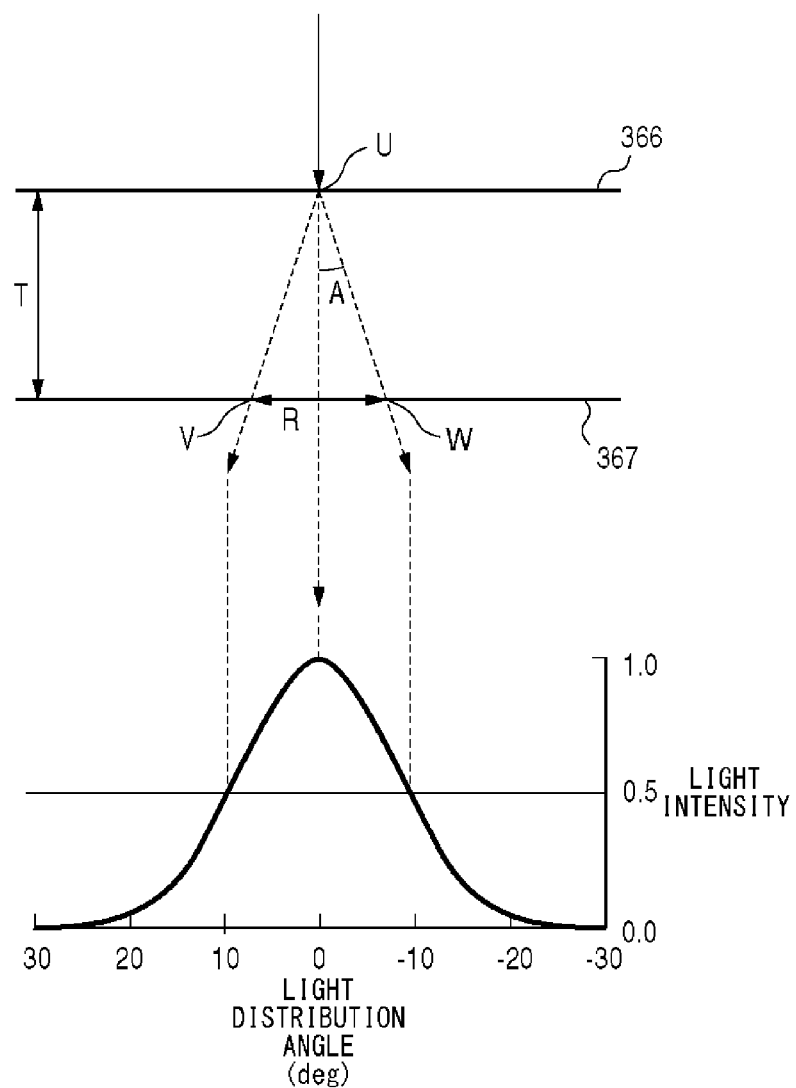
FIG. 23 is a diagram schematically illustrating a relationship among the thickness of a diffusion layer, a half-width at half-maximum angle of a transmission light distribution angle, and the resolution of a video image imaged on the transmission-type intermediate image screen.

FIG. 23 is a diagram schematically illustrating a relationship among the thickness T of a diffusion layer, a half-width at half-maximum angle A of a transmission light distribution angle, and the resolution R of a video image imaged on the transmission-type intermediate image screen 361. FIG. 23 illustrates that light that is incident on a point U on a surface 366 of the diffusion layer is diffused in the diffusion layer at the transmission light distribution angle of a luminous intensity half-width at half-maximum angle A. Light that is incident on the single point U on the surface 366 of the diffusion layer is diffused and spread out between a point V and a point W while maintaining light intensity distribution such as the one shown in FIG. 22 on a surface 367 on the side opposite to an incident surface of the diffusion layer. When a distance from the point V to the point W is set to be R, light that is incident on a single point on the surface 366 of the diffusion layer is spread out while maintaining distribution in a circle of a diameter of R with light intensity of up to 0.5. As the size of this distance R becomes smaller, there is less overlapping of image display light. Thus, detailed expression of a video image can be possible on the surface 367 on the side opposite to the incident surface of the diffusion layer. In this sense, the inventors of the subject application have found that the resolution on the surface 367 on the side opposite to the incident surface of the diffusion layer can be approximated by the distance R from the point V at which image display light having light intensity of 0.5, where the value of luminous intensity is half at the transmission light distribution angle, overlaps with neighboring image display light having light intensity of 0.5 to the point W at which image display light having light intensity of 0.5 overlaps with neighboring image display light having light intensity of 0.5 in the same way.

In FIG. 23, a relationship among the thickness T of the diffusion layer, the half-width at half-maximum angle A of the transmission light distribution angle, and the distance R from the point V to the point W can be expressed by the following Expression (1):

$$T*\tan(A)*2=R \quad (1)$$

As is obvious from Expression (1), the resolution R is proportional to the thickness T of the diffusion layer. Therefore, if the resolution R being a target value in the designing and the half-width at half-maximum angle A of the transmission light distribution angle are determined, a condition to be satisfied by the thickness T of the diffusion layer can be expressed by the following Expression (2):

$$0<T \leq R/(2*\tan(A)) \quad (2)$$

In this case, a condition "0<T" is a condition for the diffusion layer to exist, and a condition "T≤R/(2*tan(A))" is a condition for ensuring the resolution R, which is the target value in the designing. The "target value" is a lower limit value of resolution which a video image on the transmission-type intermediate image screen 361 needs to have in order to achieve resolution that needs to be ensured by a virtual image presented by the head up display 10 according to the embodiment. Since the "target value" is the lower limit value of the targeted resolution, achieving resolution that is higher than the "target value" is not a problem but is rather preferred. A specific value of the target value needs to be determined in consideration of various parameters such as a distance between a virtual image and a user expected by the head up display 10, the size of the virtual image to be presented, and visual acuity of the user. An example of the specific value of the target value is about 40 to 50 micrometers as described above.

FIG. 24 is a diagram illustrating, in a table format, results of researching influence of the thickness T of the diffusion layer on the resolution of a real image imaged on a surface of the transmission-type intermediate image screen 361 by changing the thickness T of the diffusion layer, and calculated values of the resolution R that are obtained using Expression (1). As shown in FIG. 24, as the value of the thickness T of the diffusion layer increases, the resolution of the transmission-type intermediate image screen 361 decreases. Also, it can be understood that the calculated values of the resolution R obtained using Expression (1) are close to the resolution R of the real image on the transmission-type intermediate image screen 361 obtained by experiments.

Figure 25:
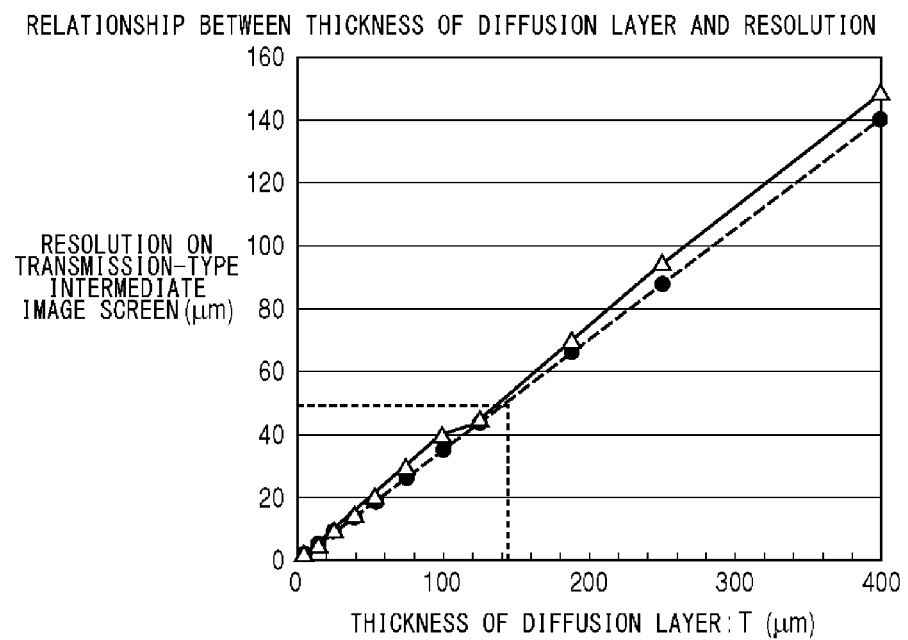
FIG. 25 is a graph illustrating a relationship between the thickness of the diffusion layer and the resolution of a real image imaged on the surface of the transmission-type intermediate image screen and a relationship between the thickness of the diffusion layer and the calculated values of the resolution.

FIG. 25 is a graph illustrating a relationship between the thickness T of the diffusion layer and the resolution R of the real image imaged on the surface of the transmission-type intermediate image screen 361 and a relationship between the thickness T of the diffusion layer and the calculated values of the resolution R that are obtained using Expression (1). As described above, in the head up display 10 according to the embodiment, if the resolution R of a real image imaged on the transmission-type intermediate image screen 361 is about 50 micrometers, a video image having sufficient resolution can be provided to the user. As shown in FIG. 25, a condition that needs to be satisfied by the thickness T of the diffusion layer in order for the resolution R of the real image imaged on the surface of the transmission-type intermediate image screen 361 to be 50 micrometers or less is that T is 140 micrometers or less. As shown in comparative examples 1-3 in FIG. 24, it has been confirmed by experiments that when the thickness T of the diffusion layer becomes thicker than 125 micrometers, the resolution R of the real image imaged on the surface of the transmission-type intermediate image screen 361 becomes 50 micrometers or more.

Summarizing the above, when presenting to a user a video image of a size of about 10 inches and a viewing angle of 10 degrees approximately 1.7 to 2 meters ahead via the combiner 400 using the head up display 10 according to the embodiment, the thickness T of the diffusion layer in the transmission-type intermediate image screen 361 is preferably set to be 125 micrometers or less. By setting the thickness of the diffusion layer in the transmission-type intermediate image screen 361 to be 125 micrometers or less, a video image that has a wide viewing angle, that is bright without a hot spot, and that has sufficient resolution can be provided when a user having visual acuity of 2.0 or less views a virtual image of about 10 inches 1.7 to 2 meters or more ahead.

[Reflection-Type Intermediate Image Screen]

In the above, a case where a transmission-type intermediate image screen 361 is used as an intermediate image screen 360 has been explained. A case where a reflection-type intermediate image screen 362 is used as an intermediate image screen 360 is now explained. For the sake of ease of explanation, an explanation is given based on the assumption that an on-dashboard-type head up display 11, which is installed on a dashboard of a car or the like for use, is used as a head up display. However, a person skilled in the art should easily appreciate that a reflection-type intermediate image screen 362 can be also used in a head up display 10 that is designed to be attached to a rear-view mirror 600 for use.

Figure 26:
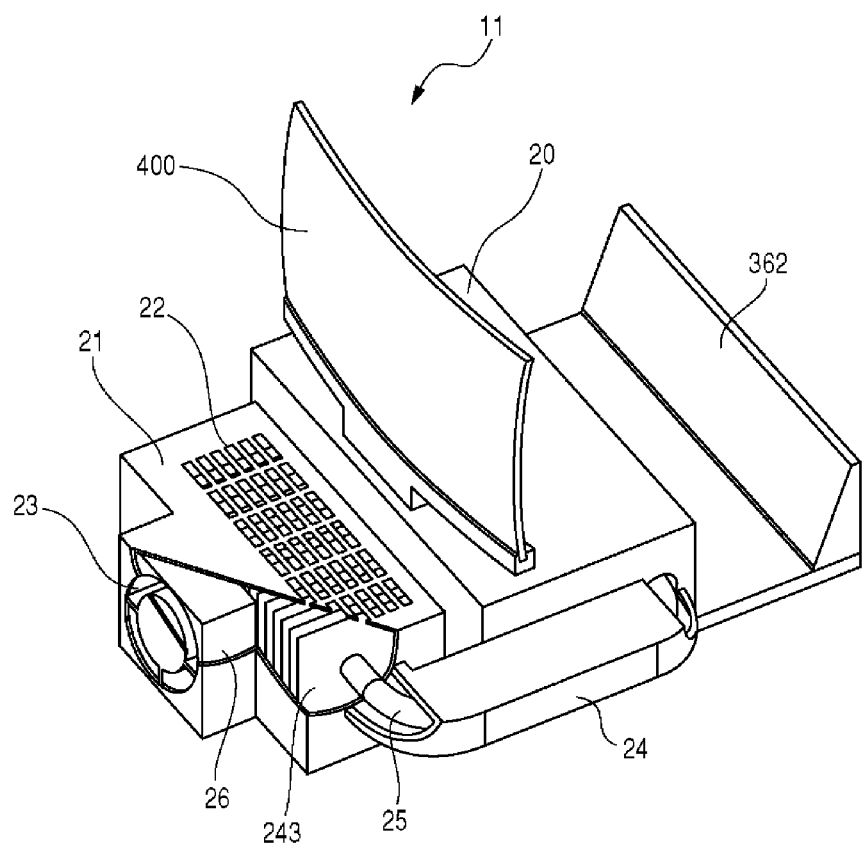
FIG. 26 is a perspective view showing the exterior appearance of an on-dashboard-type head up display according to the embodiment.

FIG. 26 is a perspective view showing the exterior appearance of an on-dashboard-type head up display 11 according to the embodiment. The on-dashboard-type head up display 11 includes a main body 20 that stores a control substrate and an optical unit, a combiner 400, a reflection-type intermediate image screen 362, a heat dissipation unit 21 having ventilation holes 22 and 23, and a heat pipe cover 24.

A heat pipe 25 is stored inside the heat pipe cover 24, and the heat pipe 25 transmits heat generated inside the main body 20 to the heat dissipation unit 21. The heat dissipation unit 21 includes a heat sink 243 and a cooling fan 26 and discharges heat generated by the on-dashboard-type head up display 11 to the outside.

Figure 27:
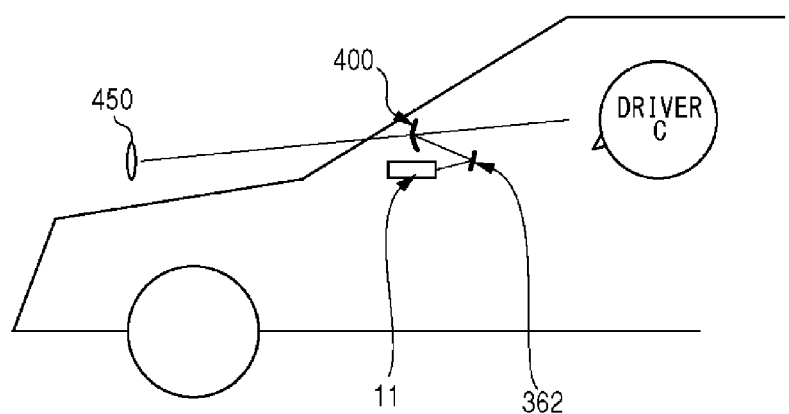
FIG. 27 is a diagram schematically illustrating a relationship between an installation position of the on-dashboard-type head up display and the position of a virtual image presented to a driver.

FIG. 27 is a diagram schematically illustrating a relationship between an installation position of the on-dashboardtype head up display 11 and the position of a virtual image 450 presented to a driver C. In FIG. 27, video light projected from the main body 20 of the on-dashboard-type head up display 11 installed on a dashboard is imaged and reflected on a reflection-type intermediate image screen 362 and projected onto the combiner 400. For the driver C observing a video image projected onto the combiner 400, the virtual image 450 is observed as if the virtual image 450 exists further away in the line of sight with respect to the combiner 400. The internal configuration of the on-dashboard-type head up display 11 and the operation thereof are the same as in the case of the head up display 10 described above. Therefore, explanations that are the same as those described for the head up display 10 are appropriately omitted or simplified in the following.

There are various variations of conventional reflection-type screens for regular uses such as mat type, bead type, pearl type, silver type, or sound screen type reflection-type screens. However, in any of the variations, a gain is low making the screen dark, and a viewing angle is wide. Thus, none of them are adequate for a head up display. Also, specular reflection caused by a specular surface creates a problem where a hot spot of the light source 231 becomes too bright for a user and that a video image therefore becomes hard to see since brightness distribution becomes too large.

In order to overcome these problems, a reflection-type screen has been developed that laminates a transmission-type high-gain diffusion layer or diffusion film with an optimal light distribution directly on a plate-like or sheet-like specular reflection surface and that projects a video image on the surface thereof. However, a reflection-type intermediate image screen 362 for a head up display is expected to show, on a combiner 400 or a windshield, a real image that is imaged on the screen so as to allow the user, who is the driver, to observe an enlarged virtual image of the real image. Therefore, a reflection-type intermediate image screen 362 for a head up display is required to have a small screen size and a high resolution compared to a reflection-type screen for regular uses.

Figure 28:
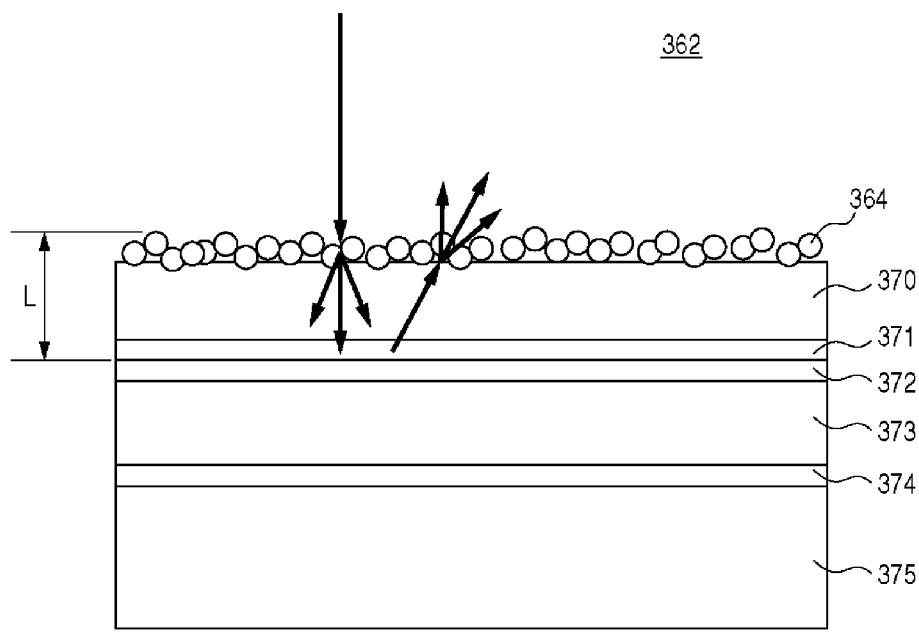
FIG. 28 is a cross-sectional view schematically illustrating a cross-sectional surface of a reflection-type intermediate image screen according to the embodiment.

FIG. 28 is a cross-sectional view schematically illustrating a cross-sectional surface of a reflection-type intermediate image screen 362 according to the embodiment. In the reflection-type intermediate image screen 362, bead diffusion materials 364, a first film base 370, a first adhesive layer 371, a reflection film 372 on which a silver screen is deposited, a second film base 373, a second adhesive layer 374, and a reinforcement base plate 375 are laminated in order from a light incident surface.

In FIG. 28, light that is incident into a layer of the bead diffusion materials 364 is diffused by the bead diffusion materials 364 reaching the reflection film 372 and is then reflected by the reflection film 372 such that the light reaches the bead diffusion materials 364 again. Therefore, in the reflection-type intermediate image screen 362, it is considered that the thickness of a layer obtained by combining the bead diffusion materials 364 and the first film base 370 has an influence on the resolution of the screen. Also, the second film base 373 and the reinforcement base plate 375 have a function of facilitating handling by a user by providing strength to the reflection-type intermediate image screen 362.

As in the case of the transmission-type intermediate image screen 361 shown in FIG. 22, the bead diffusion materials 364 shown in FIG. 28 are highly transparent beads for optics, and the diameter thereof is 10 micrometers or less. The bead diffusion materials 364 are applied on a surface of the first film base 370 in a thickness of 10 to 15 micrometers. A reflection light distribution viewing angle formed when parallel light is made incident on this is a luminous intensity half-value angle of ±7.5 to 10 degrees. This reflection light distribution angle is a value measured by a variable-angle photometer GC5000L manufactured by Nippon Denshoku Industries Co., Ltd.

Figure 29:
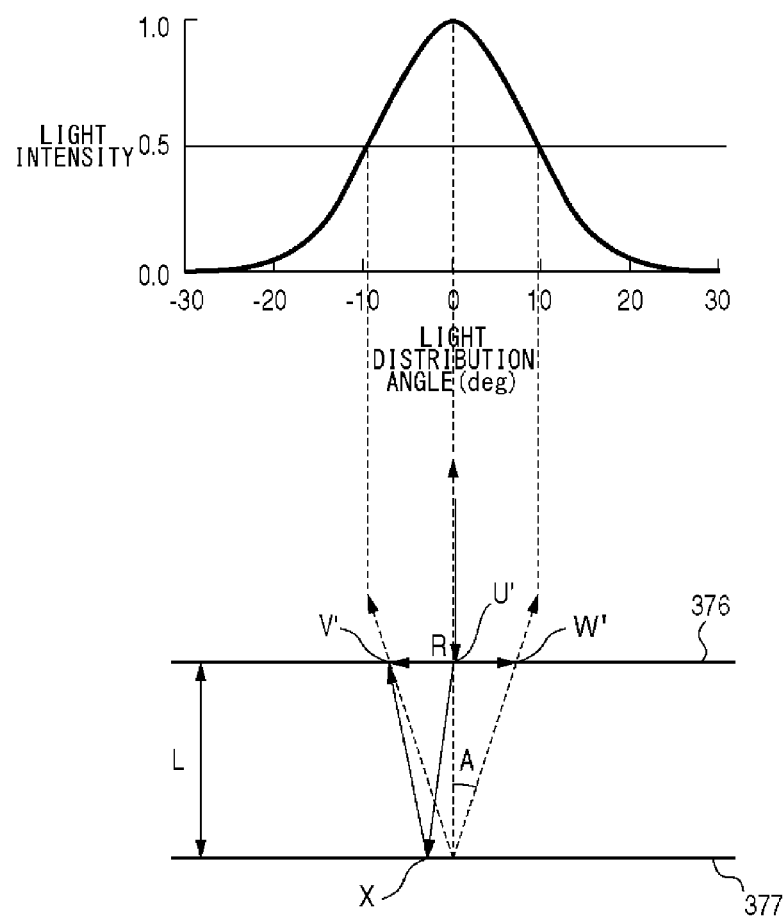
FIG. 29 is a diagram schematically illustrating a relationship among the thickness of the diffusion layer, a half-width at half-maximum angle of a reflection light distribution angle, and the resolution of a video image imaged on the reflection-type intermediate image screen.

FIG. 29 is a diagram schematically illustrating a relationship among a distance L from an incident surface to a reflection surface of image display light in the diffusion layer in the reflection-type intermediate image screen, a half-width at half-maximum angle A of a reflection light distribution angle, and the resolution R of a video image imaged on the reflection-type intermediate image screen 362. FIG. 29 illustrates that light that is incident on a point U' on a surface 376 of the diffusion layer is diffused at the half-width at half-maximum angle A of the reflection light distribution angle. Light that is incident on the single point U' on the surface 376 of the diffusion layer is diffused at that point, reflected at a point X on a reflection surface 377, then diffused again, and emitted from a point V' and a point W' on the surface 376 of the diffusion layer. When a distance from the point V' to the point W' is set to be R, light that is incident on the single point U' on the surface 376 of the diffusion layer is reflected at the reflection surface 377 and spread out while maintaining distribution in a circle of a diameter of R with light intensity of up to 0.5. As the size of this distance R becomes smaller, there is less overlapping of image display light. Thus, detailed expression of a video image can be possible on the surface 376 of the diffusion layer, which also serves as a light incident surface and a light emission surface of the diffusion layer. In this sense, the inventors of the subject application have found that the resolution on the surface 376 of the diffusion layer can be approximated by the distance R from the point V' at which image display light having light intensity of 0.5, where the value of luminous intensity is half at the reflection light distribution angle, overlaps with neighboring image display light having light intensity of 0.5 to the point W' at which image display light having light intensity of 0.5 overlaps with neighboring image display light having light intensity of 0.5 in the same way.

In FIG. 29, a relationship among the distance L from an incident surface of image display light in the diffusion layer to a reflection surface of the image display light that is incident, the half-width at half-maximum angle A of the reflection light distribution angle, and the distance R from the point V' to the point W' can be expressed by the following Expression (3):

$$L*\tan(A)*2=R \tag{3}$$

As is obvious from Expression (3), the resolution R is proportional to the distance L from the incident surface to the reflection surface of the image display light in the diffusion layer. Therefore, if the resolution R being a target value in the designing and the half-width at half-maximum angle A of the reflection light distribution angle are determined, a condition to be satisfied by the distance L from the incident surface to the reflection surface of the image display light in the diffusion layer can be expressed by the following Expression (4):

$$0<L\leq R/(2*\tan(A)) \tag{4}$$

In this case, a condition "0<L" is a condition for the diffusion layer to exist, and a condition "L≤R/(2*tan(A))" is a condition for ensuring the resolution R, which is the target value in the designing.

FIG. 30 is a diagram illustrating, in a table format, results of researching influence of the distance L to the reflection surface on the resolution of a real image imaged on a surface of the reflection-type intermediate image screen 362 by changing the distance L from the incident surface to the reflection surface of the image display light in the diffusion layer, and calculated values of the resolution R that are obtained using Expression (3). As shown in FIG. 30, as the value of the distance L to the reflection surface increases, the resolution R of the reflection-type intermediate image screen 362 decreases. Also, it can be understood that the calculated values of the resolution R obtained using Expression (3) are close to the resolution R of the real image on the reflection-type intermediate image screen 362 obtained by experiments.

Figure 31:
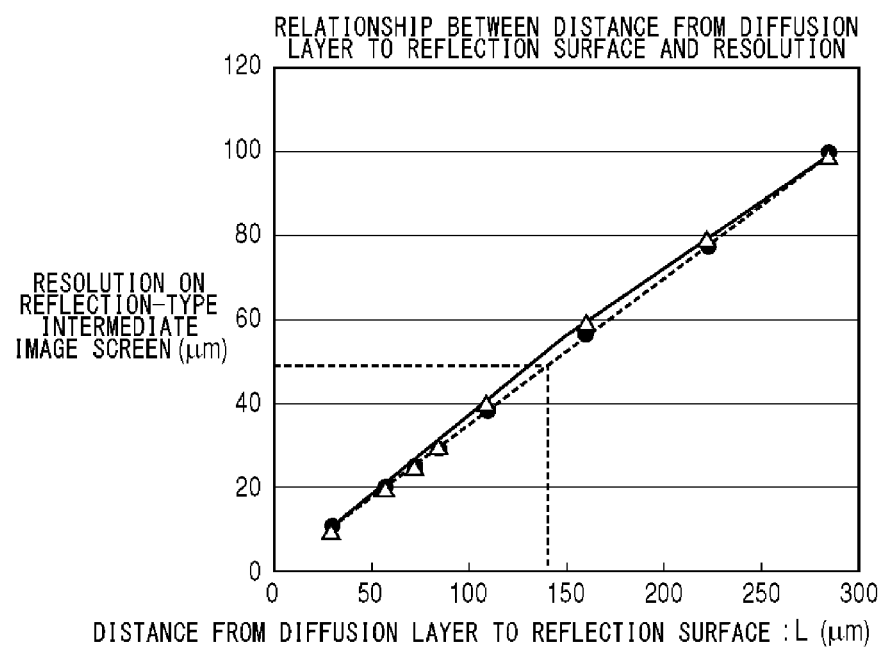
FIG. 31 is a graph illustrating a relationship between the distance from the diffusion layer to the reflection surface and the resolution of a real image imaged on the surface of the reflection-type intermediate image screen and a relationship between the distance from the diffusion layer to the reflection surface, and the calculated values of the resolution.

FIG. 31 is a graph illustrating a relationship between the distance L from the incident surface to the reflection surface of the image display light in the diffusion layer and the resolution R of a real image imaged on a surface of the reflection-type intermediate image screen 362 and a relationship between the distance L to the reflection surface and the calculated values of the resolution R that are obtained using Expression (3). As in the case of the head up display 10, in the on-dashboard-type head up display 11, if the resolution R of a real image imaged on the reflection-type intermediate image screen 362 is about 50 micrometers, a video image having sufficient resolution can be also provided to the user. As shown in FIG. 31, a condition that needs to be satisfied by the distance L from the incident surface to the reflection surface of the image display light in the diffusion layer in order for the resolution R of the real image imaged on the surface of the reflection-type intermediate image screen 362 to be 50 micrometers or less is that L is 140 micrometers or less. As shown in comparative examples 1-3 in FIG. 30, it has been confirmed by experiments that when the distance L from the incident surface to the reflection surface of the image display light in the diffusion layer becomes thicker than 110 micrometers, the resolution R of the real image imaged on the surface of the reflection-type intermediate image screen 362 becomes 50 micrometers or more.

Summarizing the above, when presenting to a user a video image of a size of about 10 inches and a viewing angle of ±10 degrees approximately 1.7 to 2 meters ahead via the combiner 400 using the on-dashboard-type head up display 11 according to the embodiment, the distance L from the incident surface to the reflection surface of the image display light in the diffusion layer in the reflection-type intermediate image screen 362 is preferably set to be 110 micrometers or less. By setting the distance L from the incident surface to the reflection surface of the image display light in the diffusion layer in the reflection-type intermediate image screen 362 to be 110 micrometers or less, a video image that has a wide viewing angle, that is bright without a hot spot, and that has sufficient resolution can be provided when a user having visual acuity of 2.0 or less views a virtual image of about 10 inches 1.7 to 2 meters or more ahead.

[Installation of Intermediate Image Screen]

As described above, an intermediate image screen 360 according to the embodiment has a thickness of approximately 20 micrometers to 200 micrometers regardless of the types of "transmission-type" and "reflection-type." Therefore, since an intermediate image screen alone lacks rigidity, an intermediate image screen 360 is preferably held using some sort of holding member during handling such as installation, replacement, or the like. Further, even when an intermediate image screen 360 having sufficient rigidity is used, some sort of protection member is preferably installed in order to prevent soiling, scratching, or the like of the intermediate image screen 360. An explanation is given in the following regarding the holding and protection of the transmission-type intermediate image screen 361 according to the embodiment.

Figure 32:
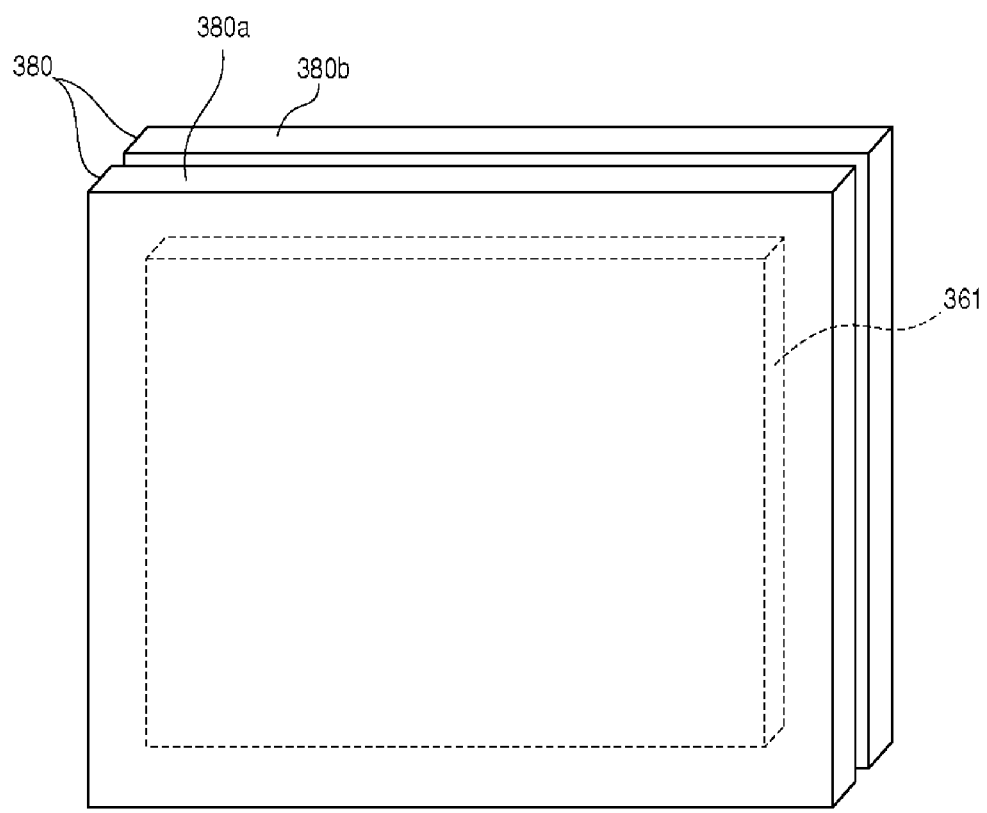
FIG. 32 is a diagram schematically illustrating an example of a three-layer portion according to the embodiment.

FIG. 32 is a diagram schematically illustrating an example of a three-layer portion 380 according to the embodiment. The three-layer portion 380 has a three-layer structure including a first plate 380a and a second plate 380b with a transmission-type intermediate image screen 361 put between the first plate 380a and the second plate 380b.

With respect to the transmission-type intermediate image screen 361, the first plate 380a is a front surface plate located on an incident surface of image display light and functions as a protection plate that protects the transmission-type intermediate image screen 361. The first plate 380a is a highly transparent plastic such as acrylic, polycarbonate, or the like, and dust proof, chemical resistant, and scratch resistant features are provided to a surface on which image display light is incident.

The second plate 380b is a rear surface plate provided facing the first plate 380a while having the transmission-type intermediate image screen 361 in between and functions as a protection plate that protects the transmission-type intermediate image screen 361 just like the front surface plate. The second plate 380b is also a highly transparent plastic such as acrylic, polycarbonate, or the like just like the first plate 380a. The second plate 380b along with the first plate 380a holds the transmission-type intermediate image screen 361 therebetween, keeping the shape of the transmission-type intermediate image screen 361 flat by preventing warpage or undulation of the transmission-type intermediate image screen 361 so as to reinforce the transmission-type intermediate image screen 361 such that the holding position does not move. An example of the size of the first plate 380a and the second plate 380b according to the embodiment is 19.0 mm height, 13.0 mm width, and 1 mm thickness. In comparison to the transmission-type intermediate image screen 361, the first plate 380a and the second plate 380b are thicker and thus function as reinforcing plates that reinforce the installed condition of the transmission-type intermediate image screen 361.

As described, the three-layer portion 380 has a multi-layer structure having at least three layer portion of the first plate 380a, the transmission-type intermediate image screen 361, and the second plate 380b. However, the holding position may move during transportation or driving if these layers are merely stacked in a tightly attached manner. Also, since each layer is a plastic member, there may be a slight movement in the holding position due to thermal expansion or warpage caused by internal and external environmental temperature. Therefore, this multi-layer structure is preferably fixed by some sort of means. Thus, a possible method is to fix the first plate 380a and the transmission-type intermediate image screen 361 or the second plate 380b and the transmission-type intermediate image screen 361 putting an adhesive layer, which includes glue or adhesive, therebetween. However, the inventors of the subject application have found that the use of an adhesive layer for the fixation of the transmission-type intermediate image screen 361 may cause "yellow discoloration" where the adhesive layer turns yellow due to changes over time that are caused by temperature, humidity, and the like and that this may cause degradation in performance as a screen as a result.

Thus, in the three-layer portion 380 according to the embodiment, instead of fixing the three layers: the first plate 380a; the transmission-type intermediate image screen 361; and the second plate 380b, in a laminated manner by forming an adhesive layer between the layers, a means is used that allows these three layers to be fixedly held in an easy and inexpensive manner.

Figure 33:
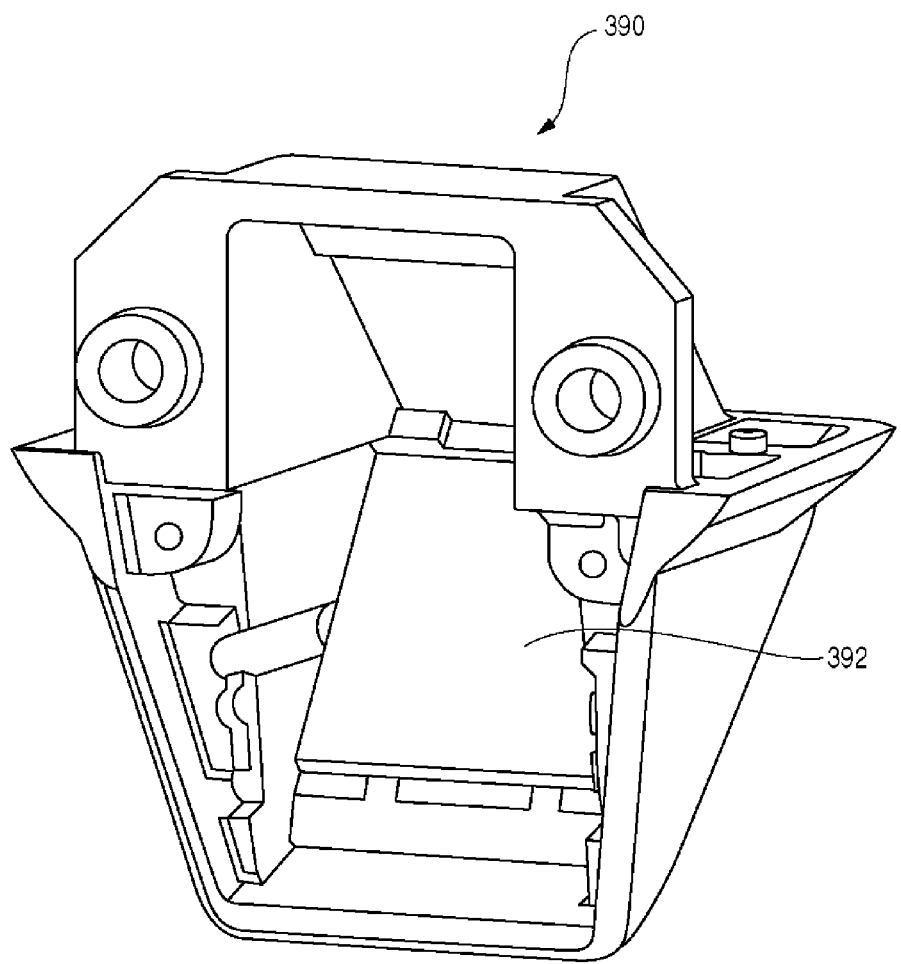
FIG. 33 is a perspective view schematically illustrating an intermediate image screen holding unit inside the projection unit according to the embodiment.

FIG. 33 is a perspective view schematically illustrating a screen holding unit 390 inside the projection unit according to the embodiment. A storage space 392 for storing the three-layer portion 380 is provided in the screen holding unit 390. The storage space 392 is a space in which the three-layer portion 380 is set in and held.

Figure 34:
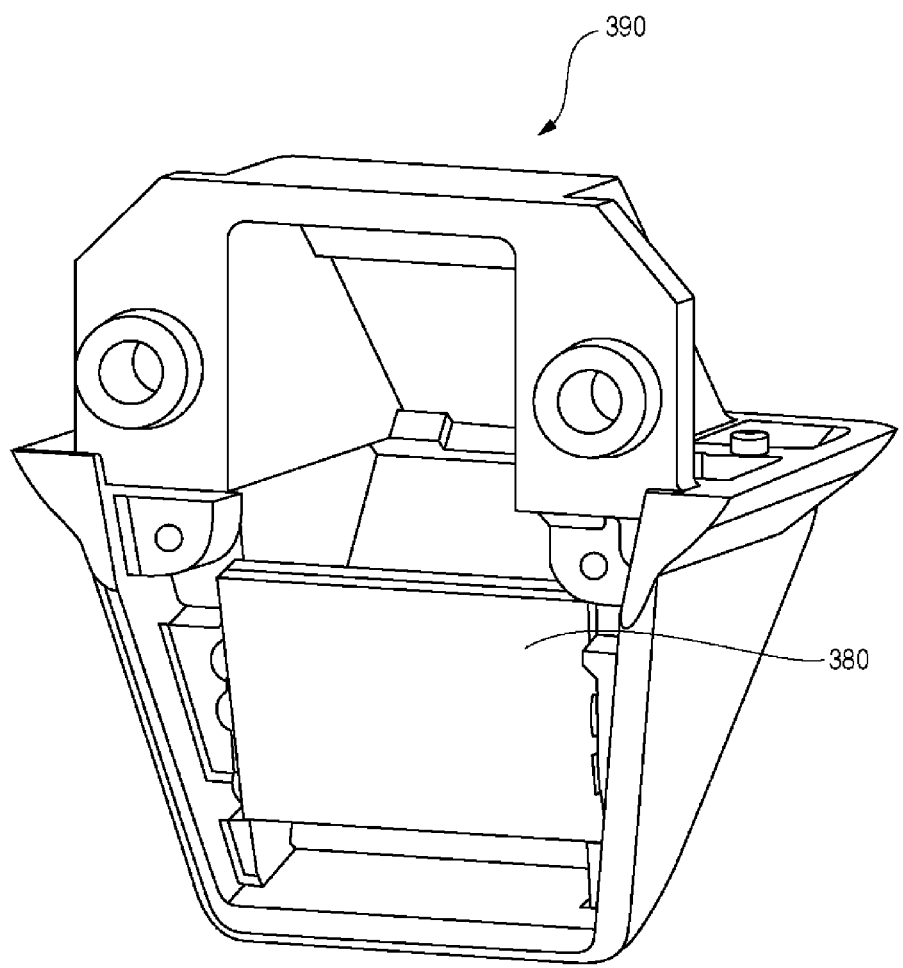
FIG. 34 is a perspective view explaining a state where the three-layer portion is installed in the intermediate image screen holding unit.

FIG. 34 is a perspective view explaining a state where the three-layer portion 380 is installed in the screen holding unit 390. The three-layer portion 380 including the transmission-type intermediate image screen 361, the front surface plate, and the rear surface plate is fixed to the screen holding unit 390 by first putting a side surface of the three-layer portion 380 on a pedestal located on the lower side in the figure, which represents a reference position in the storage space 392, placing the outer periphery of the three-layer portion 380 down in a step portion, and collectively fixing two central parts of the both ends of the side surfaces of the three-layer portion 380 by glue while pressing down the three-layer portion 380. As the glue for the fixing, any glue may be used as long as the glue can fix a thermosetting resin and a UV-curable resin. Two central parts of the both ends are fixed in the embodiment. However, as long as one or more parts are fixed, the number of parts is not limited, for example, four parts of the ends or four parts at four corners may be fixed.

Figure 35:
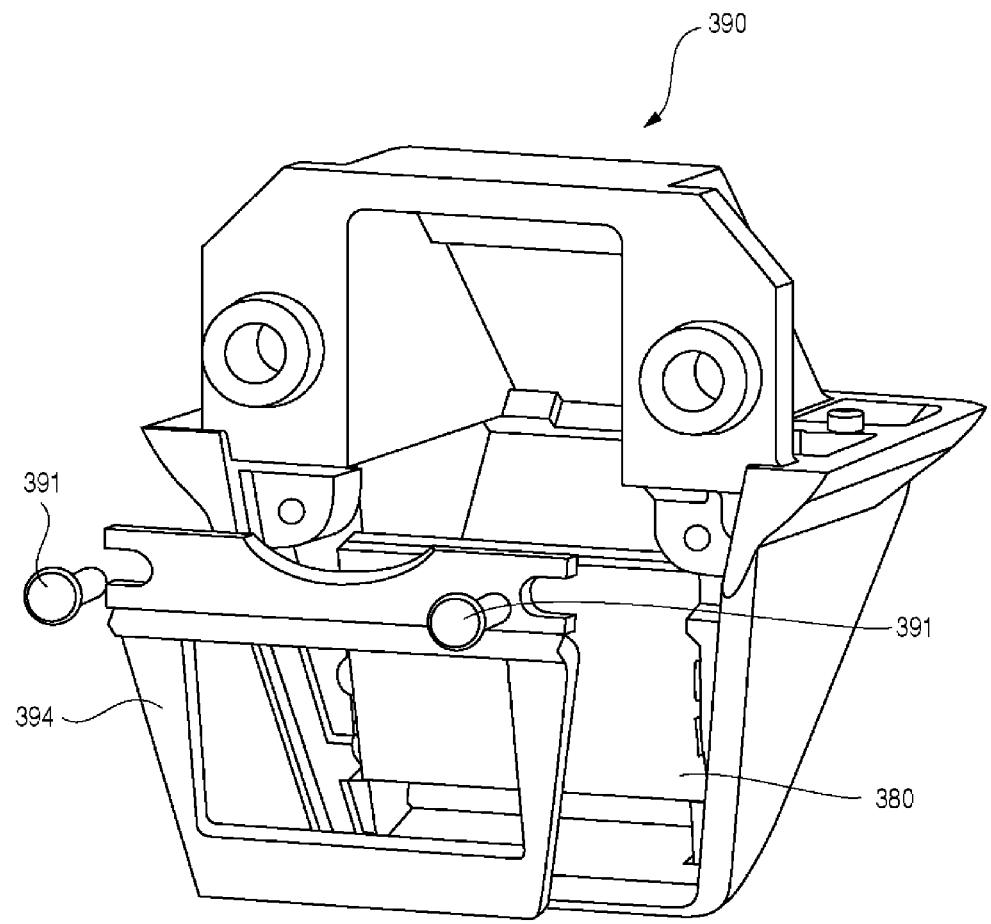
FIG. 35 is a perspective view illustrating a state where an intermediate image screen mask member is installed covering the three-layer portion.

FIG. 35 is a perspective view illustrating a state where an intermediate image screen mask member 394 is installed covering the three-layer portion 380. As shown in FIG. 35, the outer periphery portion of the three-layer portion 380 fixed to the screen holding unit 390 is covered by the intermediate image screen mask member 394, which is mounted by screws 391 at two parts on the upper side thereof in the figure. Alternatively, the three-layer portion 380 may be fixed by pressing the three-layer portion 380 onto the screen holding unit 390 by the elastic force of the intermediate image screen mask member 394, as well as covering the outer periphery portion of the three-layer portion 380 by the intermediate image screen mask member 394. The screws 391 for mounting of the intermediate image screen mask member 394 used at this time are not limitedly screwed at the two parts on the upper side in the figure. As long as a plurality of parts are screwed, the number of parts is not limited, for example, the screws may be screwed at two parts at the top and the bottom, two parts at the left and the right, or four parts at four corners.

This allows the screen holding unit 390 to fix the three-layer portion 380 in an easy and inexpensive manner. Also, since the three layers: the first plate 380a; the transmission-type intermediate image screen 361; and the second plate 380b, are fixed without using a bonding layer or an adhesive layer between the layers, changes that are caused over time can be reduced. Also, since the three layers: the first plate 380a; the transmission-type intermediate image screen 361; and the second plate 380b, are not bonded, the transmission-type intermediate image screen 361 can be freely removed from or installed in the three-layer portion 380. This allows, for example, the replacement of only the transmission-type intermediate image screen 361. Thus, it is possible to replace a transmission-type intermediate image screen 361 whose performance is lowered due to changes over time. Further, a viewing angle, i.e., a transmission-type intermediate image screen 361 with the transmission light distribution angle shown in FIG. 23, can be installed according to the preference of a user, who is a driver.

Figure 36A:
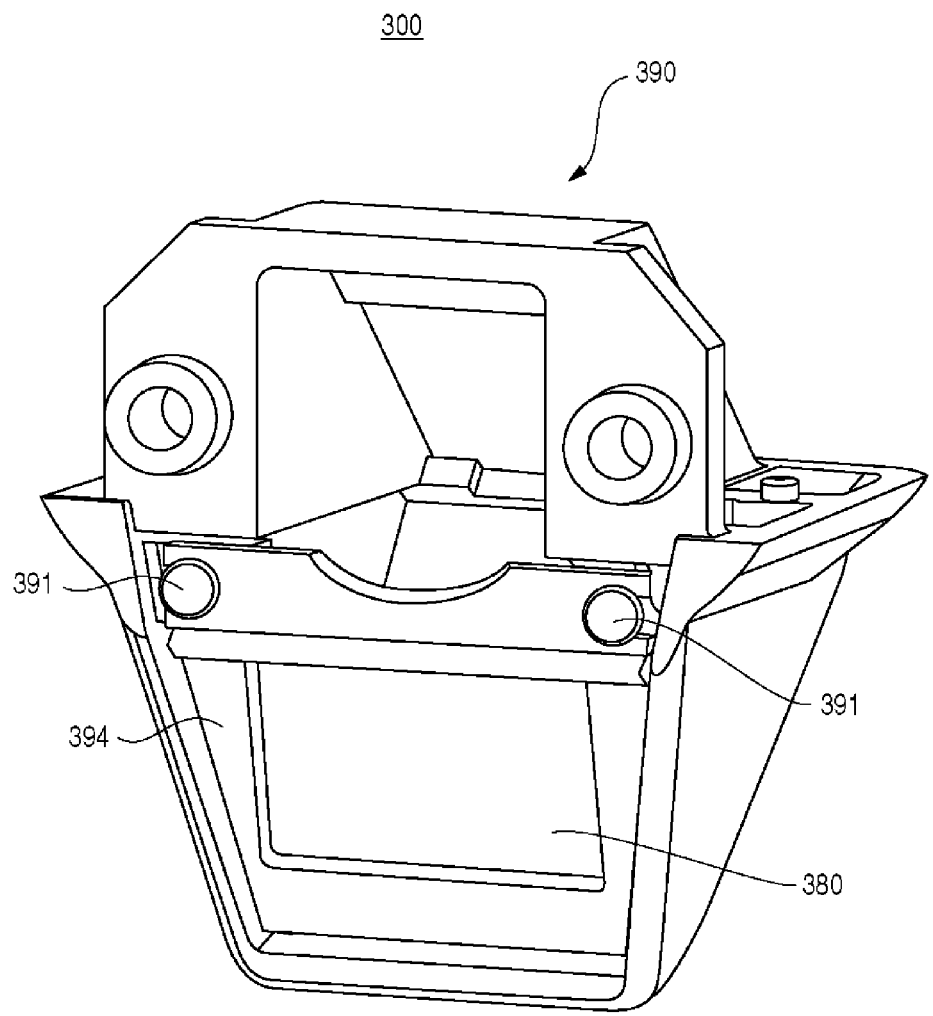
FIGS. 36A-36B are a perspective view showing a state where the projection unit is completed while the intermediate image screen mask member covers the three-layer portion and a cross-sectional view thereof, respectively.
Figure 36B:
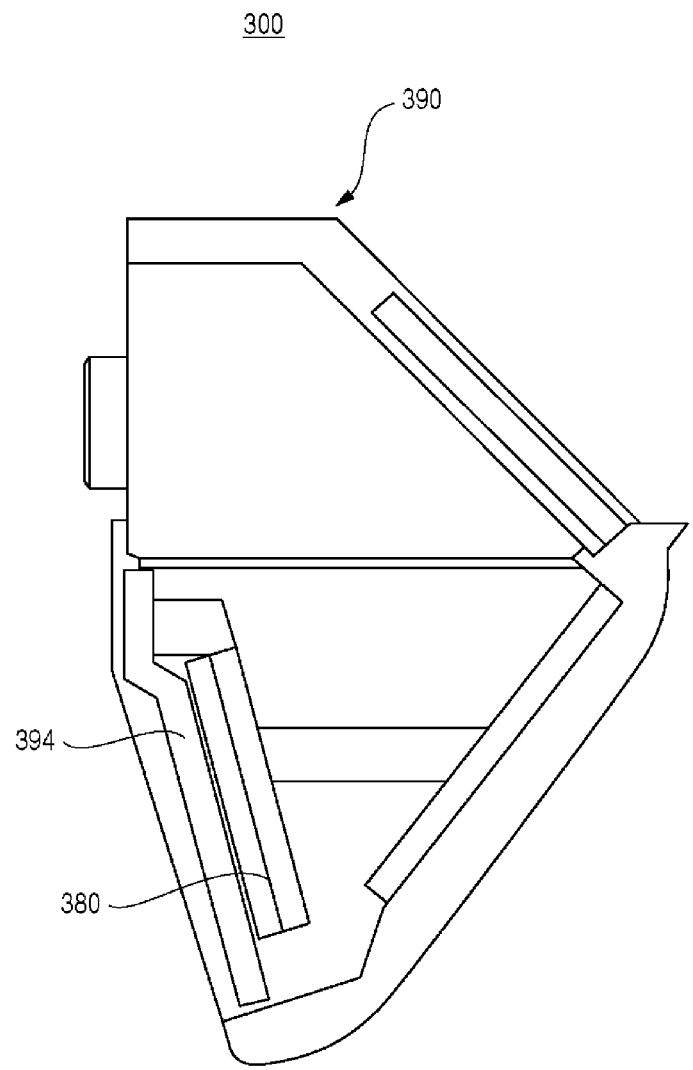

FIGS. 36A-36B are a perspective view showing a state where the projection unit 300 is completed while the intermediate image screen mask member 394 covers the three-layer portion 380 in the projection unit 300 according to the embodiment and a cross-sectional view thereof, respectively.

As shown in FIG. 36, in the projection unit 300, the three-layer portion 380 including the transmission-type intermediate image screen 361, the front surface plate, and the rear surface plate is freely removed or installed from the side of the projection port 301 of the projection unit 300 by removing the intermediate image screen mask member 394. As described above, since the projection unit 300 is freely removed from or installed in the optical unit main body 210, only the projection unit 300 can be removed and easily replaced even in a state where the head up display 10 is being installed at the rear-view mirror 600.

As explained above, according to a head up display 10 according to the embodiment of the present invention, a technology can be provided that facilitates the replacement and assembly of a screen in the head up display and that allows for inexpensive manufacturing. Also, by not using a bonding layer or an adhesive layer between the layers for the fixation of the transmission-type intermediate image screen 361, degradation in optical performance due to yellow discoloration of a bonding layer or an adhesive layer does not occur.

Described above is an explanation of the present invention based on the embodiment. The embodiment is intended to be illustrative only, and it will be obvious to those skilled in the art that various modifications to constituting elements and processes could be developed and that such modifications are also within the scope of the present invention.

[Exemplary Variations of Intermediate Image Screen]

In the above embodiment of the present invention, an explanation is made regarding a case where a diffusion layer having a haze value (cloudiness) of 84 to 90 percent when parallel light is made incident thereon is used in a transmission-type intermediate image screen 361 and a reflection-type intermediate image screen 362. Regarding a diffusion layer and surface nature of a diffusion sheet, as long as the haze value (cloudiness) thereof is 84 to 90 percent, any kind of diffusion may be employed such as diffusion of a concavo-convex shape type, diffusion of an air-bubble type, diffusion of a lens type, diffusion of a relief hologram pattern, and the like, instead of bead diffusion. Needless to say, it is necessary for a particle diameter of a diffusion material, a lens pitch, a concavo-convex shape pitch, a pattern pitch, and an air-bubble diameter, which are the smallest units for having a diffusion function of forming a diffusion layer of the intermediate image screen, to be smaller than the target value R of the resolution of a real image imaged on the intermediate image screen in order to allow for easy analogy. Furthermore, for the reflection surface of the reflection-type intermediate image screen 362, a specular surface aluminum film sheet may be used instead of a specular surface silver film sheet. Also, as long as a high-reflectivity specular reflection surface is used under a diffusion layer or a diffusion film, the specular reflection surface may have a plate-like shape instead of a sheet-like shape.

[Exemplary Variations of Three-Layer Portion]

In the above embodiment of the present invention, an explanation is made regarding a case where the three layers: the first plate 380a; the transmission-type intermediate image screen 361; and the second plate 380b, in the three-layer portion 380 are separate. As long as at least the transmission-type intermediate image screen 361 can be removed from or installed in the three-layer portion 380, all the three layers do not always need to be separate.

Figure 37:
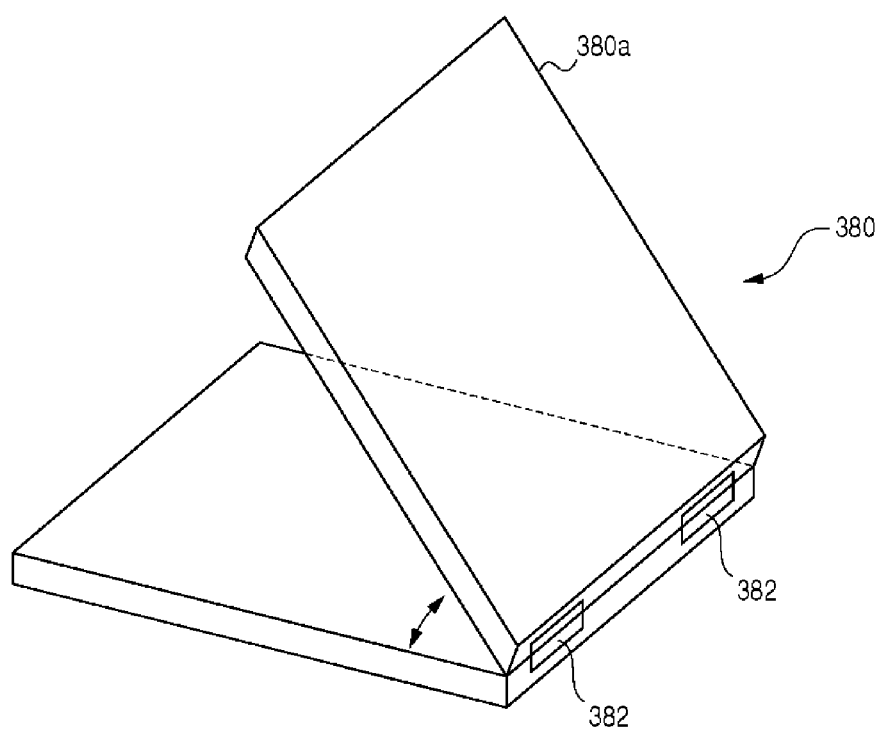
FIG. 37 is a diagram schematically illustrating another example of the three-layer portion according to the embodiment.

FIG. 37 is a diagram schematically illustrating another example of the three-layer portion 380 according to the embodiment. In an example shown in FIG. 37, a first plate 380a and a second plate 380b are connected by small hinges 382. Therefore, the first plate 380a and the second plate 380b are freely rotatable by the hinges 382. As described above, the first plate 380a and the second plate 380b are small being 19.0 mm height, 13.0 mm width, and 1 mm thickness. Therefore, in comparison with a case where the two are independently and separately movable, there is an advantage of facilitating a work of, e.g., replacing the transmission-type intermediate image screen 361 when the movement of the two are limited as shown in FIG. 37.

Although not shown in the figure, as yet another example of the shape of the three-layer portion 380 according to the embodiment, the three-layer portion 380 may be shaped such that three sides of the first plate 380a and three sides of the second plate 380b that correspond to the three sides of the first plate 380a are connected and that the respective remaining sides are open allowing the transmission-type intermediate image screen 361 to be put in and out. As yet another example of the shape of the three-layer portion 380 according to the embodiment, the three-layer portion 380 may be shaped in a, so to speak, clear folder shape such that two sides of the first plate 380a and two sides of the second plate 380b that correspond to the two sides of the first plate 380a are connected and that the respective remaining two sides are open allowing the transmission-type intermediate image screen 361 to be put in and out.

What is claimed is:

1. An image display device comprising:
   a substrate housing portion that stores a circuit substrate that outputs an image signal of an image to be displayed;
   an optical unit that is provided at one end of the substrate housing portion and that generates and projects an image as image display light based on the image signal output from the circuit substrate; and
   a combiner that is provided at one end of the optical unit and on which the image display light is projected,
   wherein the optical unit has:
   an optical unit main body that includes a light source and an image display element and is provided with a first body surface and a second body surface opposite to each other; and
   a projection unit that is attached to the optical unit main body, that is provided with an intermediate image screen that images an intermediate image, and that determines a projection direction, and
   wherein the projection unit is freely removed from or installed in the optical unit main body, and a direction of attachment is changeable such that the image display light from the projection unit is projected below the optical unit main body from a projection port provided in the projection unit, regardless of whether the first body surface or the second body surface faces downward, and
   the optical unit including the projection unit and the combiner are rotatable in an integral manner with respect to the substrate housing portion regardless of whether the first body surface or the second body surface faces downward, and wherein the optical unit projects the image display light based on the image signal in which a direction of an image is changed by 180 degrees depending on whether the optical unit is attached so that the first body surface faces downward or the second body surface faces downward.

2. The image display device according to claim 1, wherein the projection unit further comprises a projection mirror that reflects the image display light projected from the optical unit, and the projection mirror reflects the image display light so as to project the image display light below the optical unit main body.

3. The image display device according to claim 1, wherein the projection unit further comprises a three-layer portion provided with a first transparent plate, the intermediate image screen, and a second transparent plate, and
   wherein the three-layer portion is fixed to the projection unit at least one part or more on a side surface of the three-layer portion and is detachable on a side toward the projection port.

4. The image display device according to claim 3, wherein the projection unit further comprises a screen mask portion that holds the three-layer portion in such a manner that the three-layer portion can be removed from and installed in the projection unit.

* * * * *